July 4, 1950     H. G. BUSIGNIES     2,513,282
BEACON SYSTEM
Filed May 14, 1945     9 Sheets-Sheet 1
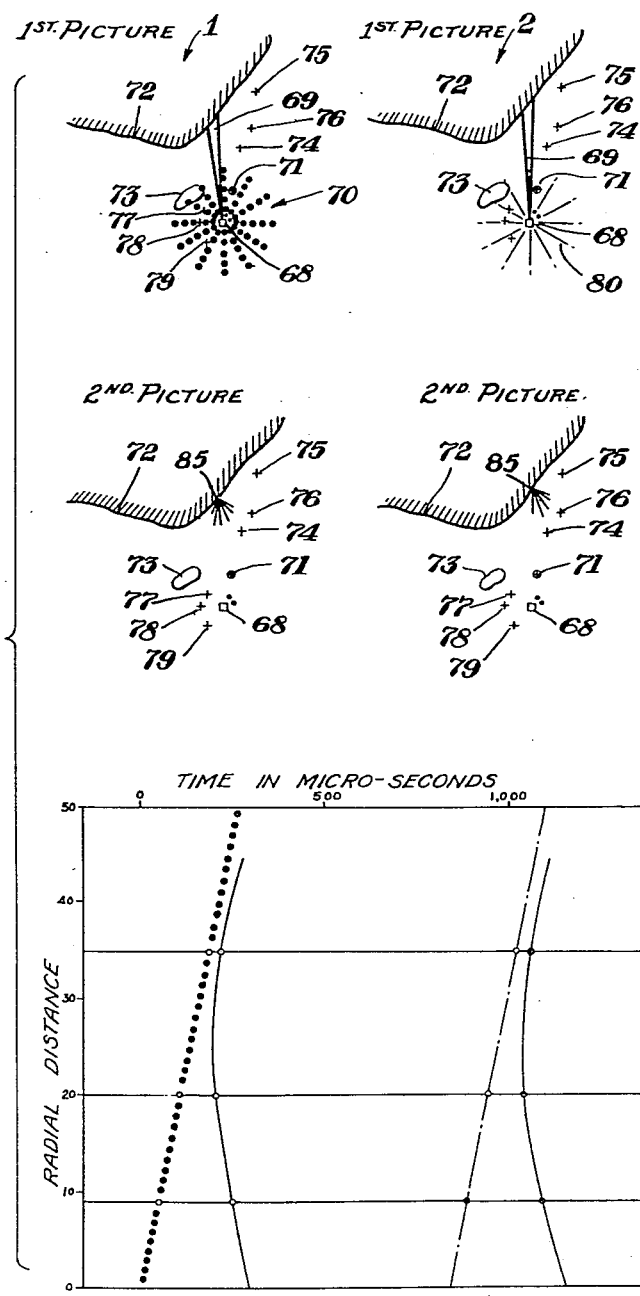
INVENTOR.
HENRI G. BUSIGNIES
BY
ATTORNEY

INVENTOR.
HENRI G. BUSIGNIES

July 4, 1950

H. G. BUSIGNIES 2,513,282

BEACON SYSTEM

Filed May 14, 1945

INVENTOR.
HENRI G. BUSIGNIES

BY

*R P Morris*
ATTORNEY

July 4, 1950  H. G. BUSIGNIES  2,513,282
BEACON SYSTEM
Filed May 14, 1945  9 Sheets-Sheet 4

INVENTOR.
HENRI G. BUSIGNIES
BY
R. P. Morris
ATTORNEY

July 4, 1950 H. G. BUSIGNIES 2,513,282
BEACON SYSTEM
Filed May 14, 1945 9 Sheets-Sheet 6

INVENTOR.
HENRI G. BUSIGNIES
BY
RP Morris
ATTORNEY

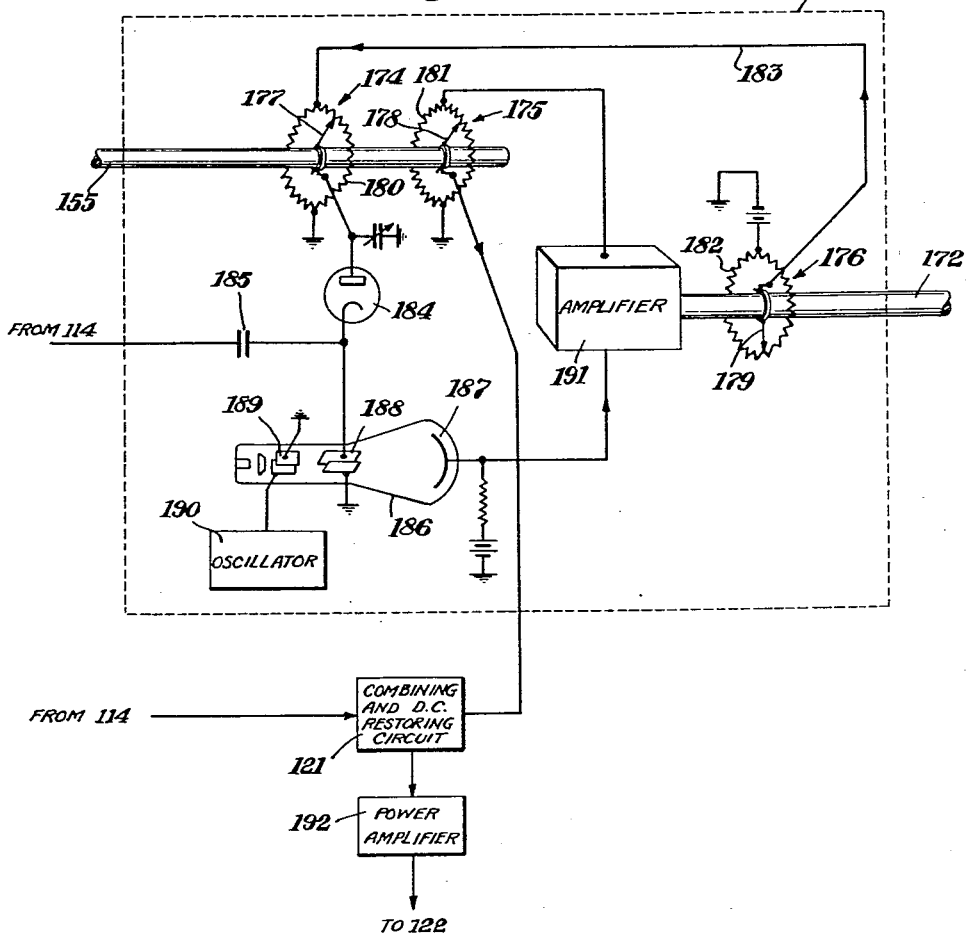

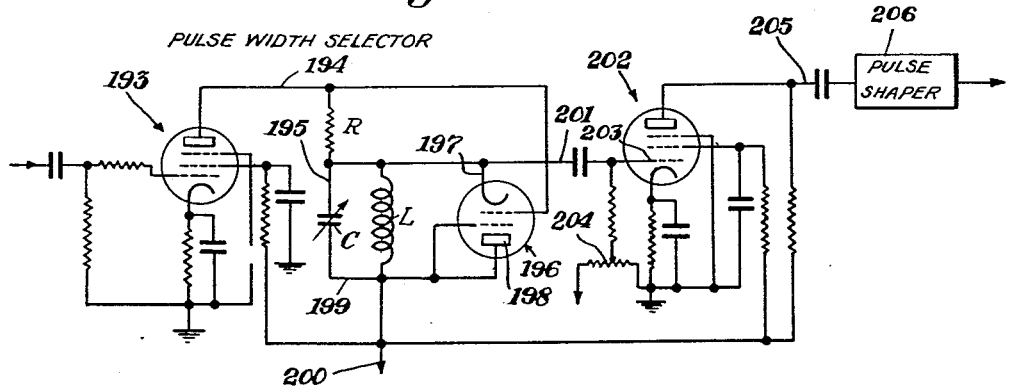
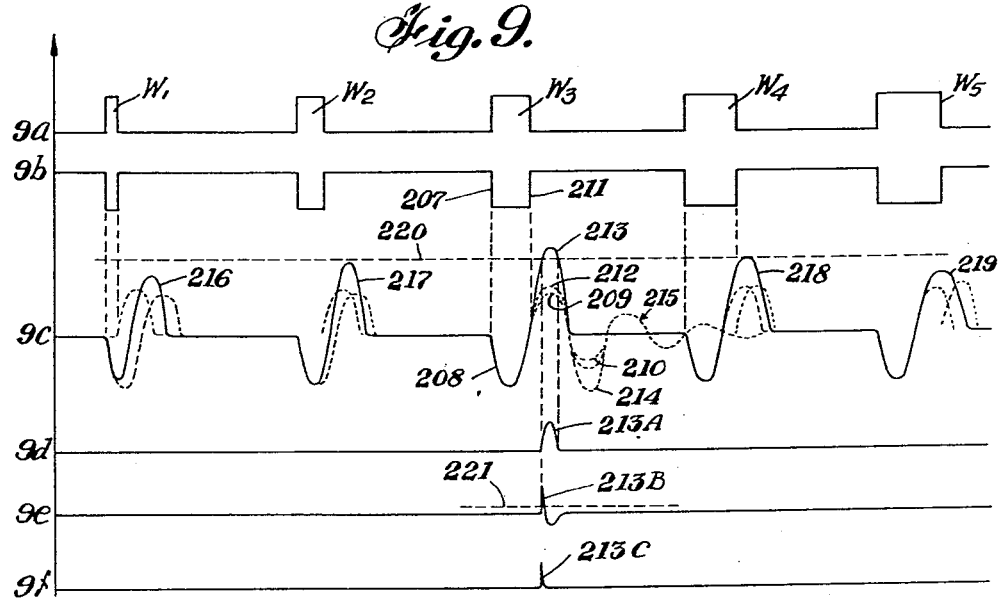

July 4, 1950  H. G. BUSIGNIES  2,513,282
BEACON SYSTEM
Filed May 14, 1945  9 Sheets-Sheet 9

INVENTOR.
HENRI G. BUSIGNIES
BY
ATTORNEY

Patented July 4, 1950

2,513,282

UNITED STATES PATENT OFFICE 2,513,282

BEACON SYSTEM

Henri G. Busignies, Forest Hills, N. Y., assignor to Federal Telephone and Radio Corporation, New York, N. Y., a corporation of Delaware Application May 14, 1945, Serial No. 593,603

32 Claims. (Cl. 343—10)

This invention relates to beacon systems and more particularly to radio beacon systems of the lighthouse type adapted to provide a display of aircraft approaching and in the vicinity of the beacon.

Radio beacon or position indicating systems wherein a display of objects which will serve to reradiate energy may be made on a distantly located receiver such as used on a moving aircraft have been proposed. In order to obtain the display indications, it is necessary to solve a series of triangles for the various reradiator positions so that the parameters for the display may be properly dimensioned. In such arrangements, in order that the position of the display receiver relative to the transmitter or radio beacon may be indicated both as to spacing and direction, it has generally been required that directive transmission be used at the radio lighthouse together with directive reception on the aircraft; or that at least two radiating sources must be provided at the beacon in known spaced relationship. These radiators may be either sharply directive or omnidirectional in this latter case. When a directive beacon is provided together with a spaced known reradiating or other radiating source, then directivity need not be used on the aircraft or distant receiver. If omnidirectional radio beacon transmitters in spaced relation are provided, then directive reception must be provided on the aircraft or other indicating receiver in order to secure the proper angular relationship on the display unit as well as to triangulate for determining the distance. The various types of radio lighthouse systems of this nature are more fully described in my copending application, entitled "Direction Finder System," Serial No. 579,568, filed February 24, 1945.

In accordance with my present invention, I provide a radio lighthouse type of equipment wherein a position display of reradiating objects may be produced in a receiver spaced from the lighthouse, in response to energy from a single lighthouse transmitter equipment having a directive radiation characteristic and without directive reception at the receiver.

According to one feature of my invention, I provide what may be termed a three-path radar equipment for producing on the aircraft or other spaced indicating receiver a position display of the indicating receiver position itself with respect to the radio lighthouse and the relative positions of other reradiating objects provided with suitable repeaters. In order to accomplish this display, energy from the radio lighthouse is transmitted directionally in successively different directions. This energy is received at each of a plurality of active repeater stations at least one of which is associated with display equipment. At the display repeater location, a pulse of different characteristics, for example on a different wavelength, may be repeated. Simultaneously with the repeating of the pulse, control of a position indicator sweep circuit is effected. This repeated pulse and similar repeated pulses from the other active repeaters serve to activate a further repeater at the radio lighthouse station. These pulses repeated from the lighthouse are then transmitted preferably omnidirectionally with particular identifying characteristics. The repeated pulse corresponding to that from the display station serves, upon receipt at the display station, to determine the distance and position of this station with respect to the radio lighthouse. The determined angle and distance parameters serve to establish the base parameter for the indicator sweep so that the pulses repeated from the radio lighthouse in response to all the active repeater pulses will produce indications of the relative location of the various active repeaters. It will thus be seen that a display of all of the active repeating objects will be provided at this display receiver unit. Preferably, the triggering pulses from the lighthouse are transmitted over a sharply directive beam so that only repeaters in line with the beam will be activated to transmit pulses to be displayed at the display unit. The display unit also sweeps around the indicator face in timed relation with the directional shift of the sharp lighthouse beam. Thus, the displays of reradiating units are produced at different angular locations dependent upon their angular position with respect to the radio lighthouse. This display will correspond substantially to an azimuthal radar display of the type which would be produced directly at the radio lighthouse station. In fact such a display may be provided at the lighthouse station also in response to the repeated pulses from the distant repeaters. The display, however, may be produced at each repeater location provided the necessary indicator equipment is supplied.

In accordance with the features of my invention outlined above, it is an object of my invention to provide a distance measuring indication system at a spaced receiver operative in response to signal energy transmitted from a spaced transmitter.

It is a further object of my invention to provide a radio position display indicator and a system for producing radio display of a plurality of reradiating objects in response to energy transmitted from a single spaced transmitter point.

It is a still further object of my invention to provide a system for producing display indications at a receiving point with only omnidirectional radiant action at this point in response to energy transmitted from a single radio lighthouse equipment.

Having determined the distance between the display receiver equipment and the radio beacon by the so-called three-path radar equipment, a radio lighthouse display may also be produced at the indicator equipment by means of the directive beacon and the various reradiating objects both active and passive, in the field thereof. For this purpose, reflected energy not dependent upon special repeated signals may be received at the indicating station. The triangle defined by the radio lighthouse display indicator and any one of the other reradiating objects may be solved by the joint cooperation of the directive transmission beam and the known distance between the display indicator receiver and the lighthouse as determined by the radar equipment. The display indicator may then be caused to deflect in accordance with the determined position indication resultant based on the spacing and the directivity of the transmitter. Accordingly, at the display indicator there may be produced a duplicate indication substantially similar to the one first described. However, in this instance, passive repeaters or reflecting objects will be shown as well as the active repeaters. In this type of display, however, the position of objects within an area defined by an ellipse including the radio lighthouse and the display indicator itself will not be capable of proper definition. At the display indicator, circuits may be provided to apply alternately the two indication voltage pulses to the display apparatus. If there is any error in the directional or distance indications of either equipment, the two patterns will not then coincide. The greatest possibility of error occurs in the distance measuring system since it is possible that the distance indicating scale of the three-path radar may be based on pulses repeated from the different equipment than the station in question. However, because this will result in distortion of the two patterns, adjustment may be readily made to make the patterns coincide to correct such error. The fact that error exists in the radio lighthouse, indications may be readily ascertained by comparison of the location of fixed known objects on a map with indications of these produced in the omni-display unit itself.

In order to produce the alternate three-path radar display and radio lighthouse displays, means is provided at the transmitter or lighthouse equipment to provide the proper cyclic switching for transmission of the various control signals. Similarly, the proper switching and blocking controls are provided in the receiver equipment at the display station to route the various received signals to the proper circuit for producing the separate displays.

In accordance with these further features of my invention it is a still further object of my invention to provide a system for producing a display of a plurality of reradiating objects in accordance with the radio lighthouse principle without the necessity of providing directivity at both the transmitter and the receiver or providing a plurality of known reference radiators.

It is a still further object of my invention to provide a receiver display indicator for alternately producing radio lighthouse position displays and a three-path radar type of position display.

It is a still further object of my invention to provide transmitter and receiver equipment capable of providing a substantially error-free indication of the position of a plurality of radiating objects at one of these reradiating object points.

While I have outlined above the general features and objects of my invention, a better understanding of these objects and features may be had from the particular description of an embodiment thereof made with reference to the accompanying drawings, in which:

Figs. 1A, 1B, 1C constitute a diagrammatic illustration of a radio lighthouse system and time chart cycle of operation in accordance with my invention showing several positions of transmission and the various cycles of operation;

Fig. 7 is a circuit diagram of a cubic-law sweep-curving circuit for use in the system of Fig. 4;

Fig. 8 is a pulse width selector which may be used in the circuits of Figs. 3 and 4;

Fig. 9 is a graphical representation serving to explain the operation of the system of Fig. 8.

Figure 1B:
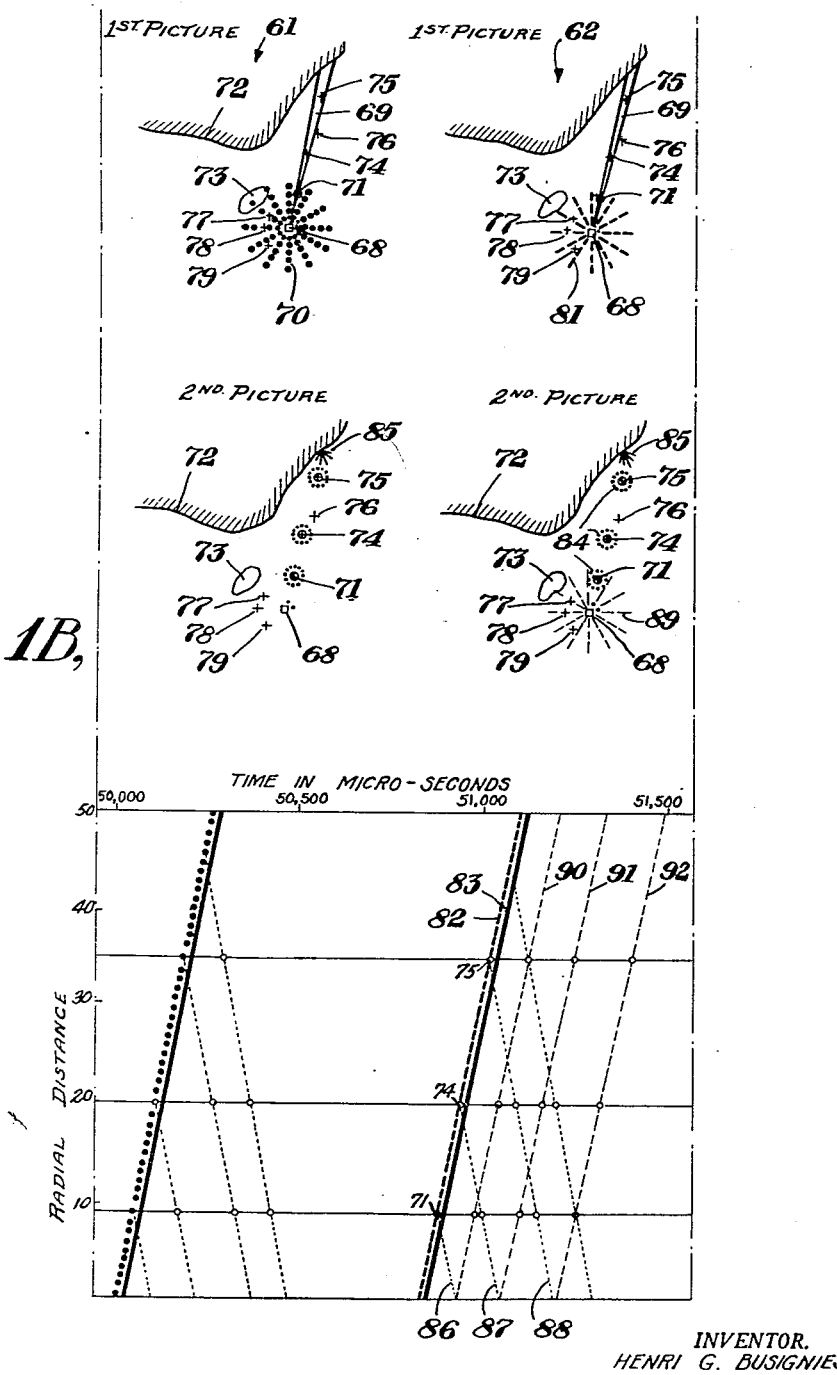

In Fig. 1 is illustrated a time chart of operations of a complete system in accordance with my invention illustrating the beacon and display receiver operation sub-cycles for certain of sixty seven time positions 1, 2, 61, 62 and 66, 67 of a rotatable lighthouse beacon, the other periods between 1 and 67 and further periods of operation being omitted. The odd numbered time sequence indications 1, 61 and 67 illustrate a part of the sub-cycle of operation relating to the radio lighthouse display transmission while the even numbered diagrams 2, 62 and 66 illustrate the sub-cycles of operation corresponding to the three-path radar display.

For the radio lighthouse display operation the radio lighthouse 68 transmits a beam of energy sharply directively as shown at 69 and simultaneously transmits omnidirectionally another series of pulses 70 preferably at a different radio frequency from those transmitted at 69. The transmission 70 is for sending synchronizing pulses for starting the sweep circuit for the radio display indicator which may be located, for example, on an aircraft indicated at 71. An obstructing mountain, for example, is illustrated at 72 and another smaller hill 73. A plurality of other aircraft 74, 75, 76, 77, 78 and 79 are shown in the vicinity of the radio lighthouse.

For the three-path radar display cycle directive beam 69 is modulated with a particular selective or interrogating signal such, for example, as pulses of a given width different from the pulses which may be transmitted in position for the radio lighthouse display. At the same time, the omnidirectional radiations at the different wavelengths may carry a special signal modulation as indicated by lines 80 for the purpose of indicating that beam 69 is passing through the true North. This will be displayed only for the small angle, for example 1°, while the beam is in this direction. For the remaining cycles of the three-path radar display transmission, other signals 81 as shown in columns 62 and 66 of the time chart will be transmitted for the purpose of starting the sweep circuit for the three-path radar display.

In explaining the principles of operation of the system, it will be most convenient separately to consider the principles of operation of the two functions which are more or less separately performed, i. e. the three-path radar (3PR) function and the radio lighthouse (RLS)) function.

The theory of the operation can best be explained by referring to the time chart shown in Fig. 1B. Since this time chart illustrates the combined operation of the complete system, including both the RLS and 3PR functions which are performed alternately in very rapid succession, it is necessary to disregard the odd numbered columns in the present discussion. The pictures and time graph shown in column 62 of this figure may be taken as best illustrating the principles of operation now being considered.

The upper picture in this column 62 shows the lighthouse 68 emitting a characteristic signal, such as a pulse of width W1, which is radiated in a narrow beam 69 at a given frequency, for example, at microwave frequencies. At the same time, this lighthouse is emitting in an omnidirectional manner, pulses 81 of a different, preferably lower frequency, for synchronizing purposes. It will be noted that the narrow beam of microwave radiations passes through the observer's own airplane 71 and two other airplanes 74 and 75 (which are all flying exactly 15° east of north) and finally strikes mountain 72; but this beam just fails to touch a fourth airplane 76 which is located slightly out of line with the others.

The time-graph at the bottom of column 62 represents only the signals existing along one arbitrarily chosen radius, drawn from the lighthouse at an angle 15 degrees east of north. With respect to this narrow region of space, the time-graph shows all signals which may exist at any radial distance up to 50 miles. In this time-graph, the vertical coordinate represents radial distance along the selected 15 degree azimuth and the horizontal coordinate represents time in microseconds.

Thus, the lower frequency synchronizing pulses 81 travelling outward from the lighthouse with the speed of light, is shown as a sloping dashed line 82 on the time-graph. This pulse is assumed to be radiated at a time after the beginning of the complete rotational cycle and, corresponding to zero miles. The maximum range of the equipment, and the rotational speed of the beacon determine the length of the radiating line. At progressive later instants of time, this pulse is shown at progressively greater radial distances, thus forming an oblique line which finally reaches a 50 mile distance about 270 microseconds later. Since the microwave beam shown in the picture of column 62 happens to lie in the 15 degree azimuth represented by the time-graph, the corresponding transmitted microwave pulse 83 is also shown as a straight heavy, solid line, starting at zero distance at the time denoted by 50,833 microseconds and travelling outward in the same way as the lower frequency synchronizing pulse just discussed.

Referring now to the second picture in column 62, it will be seen that each of the three airplanes 71, 74 and 75 which was struck by the microwave beam responds by reradiating a different lower frequency response pulse 84 in all directions. The mountain 72 is shown as merely reflecting the same energy at 85 but this reflection of radiations is of no significance at this time since the 3PR display is not intended to show passive reflections.

In the time-graph, it will be seen that at the three instants when the outward travelling microwave energy passes through the radial distances occupied by the three airplanes 71, 74 and 75 which are assumed to be at 9 miles, 20 miles and 35 miles, respectively, three lower frequency reradiations are originated at the corresponding distances, and start to travel back toward the lighthouse 68 with a slope corresponding again to the velocity of propagation as shown at 86, 87 and 88.

The second picture in column 62 represents the lighthouse 68 as again sending out a set of microwave pulses 89, which are assumed to be triggered by the arrival of the three lower frequency responses from the three planes. These pulses, however, are not transmitted in beam fashion, but are sent omni-directionally and hence produce very much weaker signal strengths than the original beamed radiations. These pulses are also characterized by a different characteristic, such as a slightly greater width than the original ones sent on beam 69. The time-graph at the bottom of column 62 clearly shows at 90, 91 and 92 that these special pulses are individually emitted at the instants of reception of the airplane responses. It will be seen for example that at the instant when the response from the nearest plane 71 reaches the lighthouse 68, a special microwave pulse 90 is emitted and commences to travel outward again.

Summing up the above, it appears that for any one airplane, a complete cycle of operation involves three successive transmissions. The first of these travels outward on the narrow beam from the lighthouse to the airplane in question; the second takes place omni-directionally and hence some of its energy returns from the plane to the lighthouse; the third transmission travels outward omni-directionally from the lighthouse to the plane.

Consider now the signals which would be observed by one particular plane, e. g. the observer's plane 71 which is assumed to be 9 miles out along the 15 degree radius represented in the graph. First this airplane receives a synchronizing signal 82 accompanied by an interrogating signal 83, these two signals arriving simultaneously. In response to the synchronizing signal the airplane performs certain internal actions such as starting a sweep circuit, but does not emit any special signals. In reply to the interrogating signal, the airplane radiates a responding signal 84.

After a suitable interval, the airplane receives from the lighthouse a weak signal 90 which represents its own response relayed back to itself. Still later this airplane receives two other similar weak signals 91, 92 from the lighthouse, which represent the responses of the two other airplanes relayed back again to the observer's airplane. In between these weak signals from the lighthouse, the airplane will also receive two response signals 87, 88 from the airplanes 74, 75 but the arrival of this energy will be of no consequence since the airplane is not conditioned to receive any signals at this wavelength during the cycles when the 3PR principle is applied.

The time intervals from the arrival of the synchronizing signal 82 to the arrival of the three special signals 90, 91 and 92 will be seen to be directly proportional to the radial distances from the lighthouse 68 to the three airplanes 71, 74, 75 which lie in the 15 degree azimuth represented in the time chart. Thus, if a simple radial sweep is applied to an oscilloscope beam on the observer's plane, and if this beam is briefly brightened in the usual way, at the instant of arrival of each of these special signals, the distances of all the three planes which are located in the 15 degree direction will be properly displayed.

In order to make this display correct as to azimuth, it is merely necessary to provide for rotating the deflection system of the oscilloscope in synchronism with the rotation of the lighthouse beam. This may be easily achieved in many ways e. g. by a motor which runs very slightly faster than the beam and a start-stop clutch which releases a deflection system control shaft for rotation in response to a special signal sent from the lighthouse each time its beam sweeps through north.

Figure 1C:
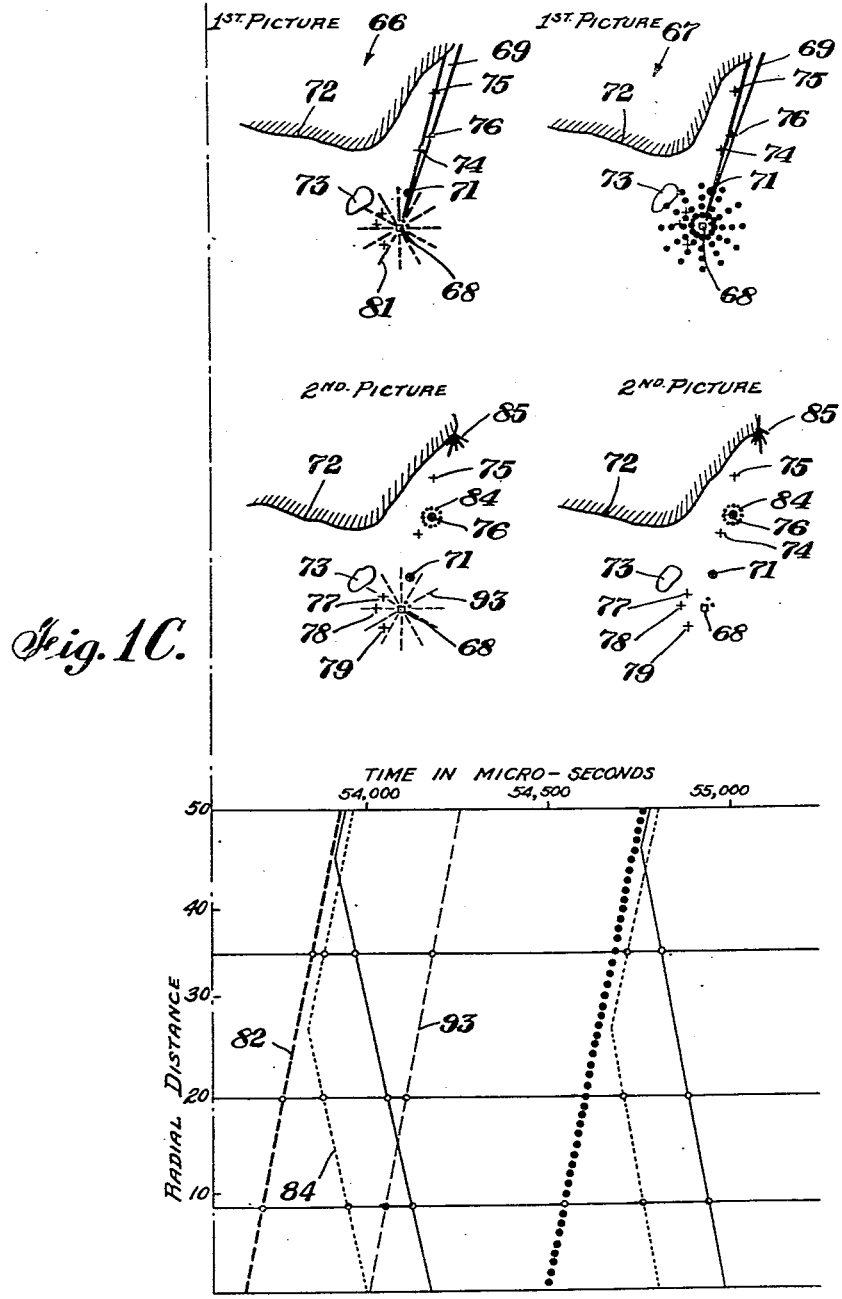

The above discussion has considered only the special case illustrated in column 62 of Fig. 1B where the beam is in line with the observer's airplane 71. For other cases, however, the operation is essentially the same except that the interrogating signal 69 will not be heard by the observer's plane when it is aimed in some other direction. Column 66 of Fig. 1C, shows a case where the rotating beam 69 no longer strikes the observer's own airplane 71 nor either of the two other airplanes 74 and 75 in the same 15 degree azimuth, but does strike an airplane 76 at about 16 degrees azimuth, as shown in the top picture of this column. The second picture of this column shows the 16 degree airplane responding with an omnidirectionally radiated UHF pulse 84, and the lighthouse 68 emitting a special microwave signal 93 in all directions, this emission being triggered by the arrival of the responsive pulse from the airplane 76.

Referring now to the time-graph at the bottom of column 66, it will be seen that this is quite similar to what would have been shown in column 62 if there had been only one airplane in the 15 degree azimuth so that only one response pulse was returned to the lighthouse and one special radiation was emitted from this lighthouse. Aside from such differences caused by the presence of only one airplane instead of three, the time-graph of column 66 is further distinguished by the fact that the original powerful microwave pulse 83 from the lighthouse is not shown travelling outward simultaneously with the synchronizing pulse 82 which starts the cycle. The reason for this is that the timegraph represents only the signals along the arbitrarily selected 15 degree radius, while at the instant represented in column 66, the microwave beam is directed slightly to the right of this radius.

The signals received by the observer's airplane 71 are all represented in the timegraph of column 66. First the synchronizing pulse 82 is received unaccompanied by interrogating pulse 83; next, the response pulse 84 from the airplane 76 strikes the observer's airplane, but this is of no consequence as previously explained. Next, the special pulse 93 omnidirectionally emitted by the lighthouse 68 at the instant of arrival of the response pulse 84 is received by the observer's airplane. Finally the energy 85 reflected by the mountain 72 strikes the observer's plane, but without any significant effect.

As in the case previously considered, the time interval from the arrival of the synchronizing pulse to the arrival of the special pulse is proportional to the radial distance of the airplane being scanned, (i. e., of the airplane 76 in the present case). Thus, the radial sweep of the oscilloscope of the observer's plane correctly displays this airplane at the proper radial distance. Since the oscilloscope's deflection system is assumed to be rotating in synchronism with the lighthouse beam, the spot representing this airplane will also be shown at the correct azimuth.

In similar manner, all other airplanes within effective range of the lighthouse will be successively scanned and properly displayed on the oscilloscope of the observer's airplane.

In order to avoid confusion in the above discussion of how a 3PR display is produced on board an airplane, consideration has been limited to one airplane 71. Other airplanes have been considered only as having responding equipments but the receiving and display equipments of these other airplanes have been disregarded. Nevertheless, it should be clear that every single one of the airplanes flying within effective range of the lighthouse may be provided with a full and accurate display similar to that provided on the particular airplane selected for consideration. Each display will show the positions of all airplanes including also the position of the airplane on which the display is given.

Points on the ground which are marked by active repeaters (responder beacons) may also be displayed in the course of the 3PR operation in the same way as above described for the display of airplanes. Natural obstacles and passive repeaters, however, will not be shown on the 3PR display, since any representation of these would give no more information than could be obtained from a printed map.

Briefly, the principle of the radio lighthouse system (RLS) type of operation is the same as the principle of operation of conventional radars except that the transmitter is widely separated from the receiver and therefore, parallex correcting means are required to eliminate the distortions resulting from such separation or offsetting of these two portions of the system, and calculation or determination of the distance must be made.

In the RLS operation of the present invention, the same general principles are used. In this case, however, the transmitter and its sharply beamed slowly rotating antenna are located on the ground, while the receiver with its omni-directional receiving antenna is located on an airplane which may be several miles away.

Figure 2:
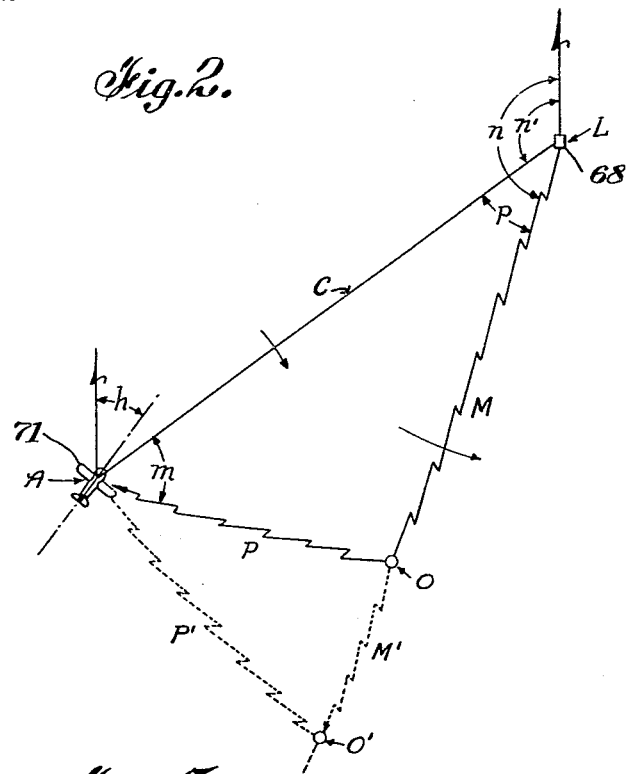
Fig. 2 is a diagrammatic illustration showing the relative position of a radio beacon lighthouse in accordance with my invention together with a display repeater unit and several repeating objects.

There is no great difficulty in determining the direction of the obstacles whose reflections are being received at any given time. Referring to Fig. 2, if the transmitter 68 is pointing south-southwest at the moment under consideration, it is clear that all the obstacles "illuminated" by such transmitter must be in a straight line extending south-southwest from the transmitting point. Therefore, the deflection coil of the indicating oscilloscope in the airplane can be turned so that at this instant it will deflect the oscilloscope beam radially in the direction representing south-southwest. Since the deflecting coil of the oscilloscope is located in the airplane and the rotating beam is on the ground, some synchronizing means is necessary to orient this coil in the same direction as the beam, but such synchronizing means are comparatively simple and reliable.

In order to explain how the correct distance can be determined in spite of the offset between the transmitter and the receiver, reference may be made to Fig. 2. The point L represents the rotary lighthouse or transmitter station on the ground 68, the points O and O' represent reflecting objects or other reradiating objects, while the point A represents the airplane 71 which carries the receiving equipment for providing the RLS display now under consideration. The jagged line extending south-southwest from 68 represents the narrow beamed radiation from the lighthouse to the object O and the length of this path from L to O (or O') is denoted by M (or by M'). The jagged line from O to A represents the reflected energy travelling from the object to the airplane and the length of this line from O (or from O') to A is denoted by P (or by P'). The airplane A is assumed to be 9 miles southwest of the lighthouse L, and the solid line C represents this distance, i. e., the offset distance between the two parts of the radar.

Consider now one particular pulse of energy radiated south-southwest from the lighthouse toward objects O and O' and reflected from these objects to the airpline 71. It is clear that the pulse will first arrive at object O and then will later reach the other object O'. The total time required for the pulse to travel from L to O and then to A, will be proportional to the sum of the distances M+P; and in the same way the total time between the radiation of the pulse from L and the arrival at A of the pulse reflected from O' will be proportional to M'+P'. It is, therefore, clear that the pulses from the two objects will not arrive at the airplane 71 at the same time, but will arrive sequentially. It is also clear that if the airplane 71 is anywhere except directly on the line LO' extended (i. e., for example at a point such as B), the pulse reflected from O will always arrive first and the pulse from O' second, just as in a normal radar. The only difference is that the lengths of the delays are not exactly proportional to the distances from L to the objects and, therefore, if a linear sweep were used on the oscilloscope, the distances would be distorted. To overcome this, it is necessary to make the sweep circuit non-linear so that it starts moving from the center of the screen very rapidly and then travels slower and slower in accordance with a certain cubic law.

At the particular moment illustrated in Fig. 2, the beam from L to the two objects is assumed to be aimed south-southwest so that the angle $n$ is 157½ degrees. The plane is shown 35½ degress south of west from the lighthouse so that the angle $n'$ is 125½ degrees. Thus, the angle $p$ (which is the difference between $n$ and $n'$) is 32 degrees. The distance C between the airplane and the lighthouse is assumed to be 9 miles.

For these particular values of angle $p$ and distance C, the length of the indirect path M+P is about 11.8 miles (assuming that O is 7 miles from L) and, therefore, the pulse travelling from the lighthouse to O and thence to the airplane 71 will have to travel 11.8 miles. For synchronizing purposes, another pulse is simultaneously sent directly from the lighthouse to the airplane along path C. Since this direct pulse travels only 9 miles while the indirect reflected pulse travels 11.8 miles, the difference in the path lengths of these two pulses will be about 2.8 miles. Taking the velocity of propagation of all the pulses as .186 mile per microsecond, the airplane will observe a delay of about 15 microseconds between the arrival of the direct pulse from the lighthouse, and the arrival of the indirect pulse reflected from object O.

In order to correctly represent the fact that object O is 7 miles from the lighthouse, the sweep voltage which deflects the beam of the oscilloscope in the airplane should, therefore, have such speed that in 15 microseconds it deflects the beam to a distance corresponding to 7 miles (i. e., ⁷/₃ inches if the desired scale is 3 inches per mile).

For another object such as O', however, (whose distance M is assumed to be 10 miles) the sum of the paths M+P will be equal to about 15.3 miles or 6.3 miles longer than the path of the direct pulse. Thus, the delay time for the pulses reflected from O' will be 34 microseconds, or more than twice as great as the delay time for the pulses reflected from O. For correct indication of object O' the sweep circuit must, therefore, produce a deflection corresponding to 10 miles (i. e., ¹⁰/₃ inch deflection) in a time of 34 microseconds.

Comparing this latter requirement with the previous requirement, it is seen that in the first 15 microseconds, the beam must move ⁷/₃ inches while in a total of 34 microseconds, it must produce a deflection of only ¹⁰/₃ inches. Thus, it must travel more than two inches during the first 15 microseconds and only one inch during the next 19 microseconds. If it is assumed that 10 volts must be applied to the oscilloscope for producing ⅓ inch deflection (i. e., for representing one mile of distance), the sweep voltage required must rise from zero to a value of 70 volts in the first 15 microseconds and must then rise more slowly from 70 to 100 volts in the next 19 microseconds.

It is clear that as the beam of the lighthouse rotates farther around so as to increase the angle $p$ to some value greater than the 32 degrees heretofore assumed, the same kind of action above described will take place with respect to the new series of objects which are now in line with the beam. Similarly, for all other values of the angle $p$, a correspondingly different curve of the sweep circuit is required.

Not only do these curves vary as the angle $p$ changes, but they also vary for different values of the distance C. Thus, if the distance C from the lighthouse to the airplane is assumed to be three miles instead of 9 miles, a different family of curves will apply.

Although the curves vary in a seemingly complicated manner with variations of $p$ and also change in scale with variations in C it turns out that they can practically be produced by adding together two very simple curves as more fully explained hereafter.

The method of producing the RLS display thus boils down to two steps:

(1) Rotating the deflection coil of the oscilloscope in synchronism with the rotation of the lighthouse beam on the ground by means of any simple synchronizing arrangement.

(2) Producing a non-linear sweep which travels rapidly at first and then more slowly.

The shapes of these curves and, therefore, the speed of travel of the sweeps must be varied for different values of the angle $p$ and the distance C. Thus, in order to obtain a correct indication, it is necessary for the airplane to know its own distance from the lighthouse, as well as its own relative azimuth angle from the lighthouse (measured with respect to the direction of the lighthouse beam at that moment). This relative azimuth angle $p$ is readily found, if the beam is rotating uniformly, by observing the instants when the beam sweeps past the airplane itself and synchronizing a shaft therewith. The distance C is determined by another mechanism of more or less conventional form hereafter described.

The need for actually knowing the airplane's own position with respect to the lighthouse in order to get a correct RLS indication may at first appear as a disadvantage. Actually, however, this is one of the extremely important advantages of the invention, since this makes it possible to check the accuracy of the airplane's own position indication in fool-proof manner, merely by noting whether the various fixed objects shown on the oscilloscope screen correspond in shape and relative position to the same objects printed on a map. If any error occurs in the self-position finding equipment which determines the airplane's own radial distance or relative azimuth with respect to the lighthouse, a corresponding distortion of the RLS indications will result, so that the natural obstacles and active and passive repeaters will no longer form a picture corresponding to that printed on a map of the terrain. In fact, no conceivable error or series of errors occurring in the mechanism could conceivably result in displaying a correctly shaped indication of the terrain if these determinations of the self-position of the airplane were incorrect.

Although the basic two functions performed by the proposed system consists of the 3PR and the RLS functions, such as performed by a three path radar and a rotary lighthouse system respectively, it has already been pointed out that for properly producing the RLS display, the airplane equipment requires a knowledge of the airplane's own distance and azimuth with respect to the lighthouse. The determination of these two factors may be made in a great many different ways but the preferred manner of accomplishing this is as follows:

The airplane's own azimuth is determined by noting the time elapsed between the instant when the lighthouse transmits a special signal 80 signifying that its beam is then passing through north of some other fixed reference direction and the somewhat later time when the rotating lighthouse beam sweeps past the airplane. The airplane's distance is determined by a simple notch followup mechanism or self-adjusting double-gate device which acts, in well known manner, to constantly align itself with a previously selected pulse which is characterized by a particular time delay with respect to the reference pulse.

It is most convenient to apply this notch followup principle to the special microwave pulses 89 which are emitted by the lighthouse in conjunction with the 3PR operation of the system since the time-distance relationship is linear for these pulses. It is well known that notch followup devices do not operate as reliably when fed with a very large number of pulses. Accordingly, the only pulses which should be delivered to the notch followup device are the special microwave pulses emitted received from the lighthouse at those instants when the lighthouse beam is aligned with the observer's own airplane. Referring to Fig. 1B, this means that only the special microwave pulses 89 illustrated in column 62 will be applied to the notch followup mechanism. All other types of pulses, and all the similar special microwave pulses emitted during the other portions of the cycle are screened out before application to the notch followup unit.

Ordinarily, the result will be that only the pulses representing the position of the observer's own airplane will be delivered to the notch followup unit, since there will not usually be more than two airplanes lying within plus or minus half a degree from the exact azimuth angle of the observer's own airplane, unless there are more than 360 airplanes surrounding the field at one time. In order to illustrate the most disadvantageous conditions, however, the chart of Figure 1 has been drawn on the assumption that three different airplanes 71, 74 and 75 are simultaneously flying at the same azimuth angle. Under these conditions, three separate pulses will be applied to the notch circuit in each pulse cycle such as shown in column 62. Even under such conditions, the notch followup mechanism will almost always correctly follow the pulse upon which it is already set. Thus, if the airplane is the only one flying at its particular azimuth angle at the moment when it enters the effective field of the lighthouse, its notch which then receives only the pulses corresponding to its own position, will correctly adjust itself to such pulses and will thereafter follow these even during intervals when several other planes are occupying the same azimuth.

Any notch followup device is theoretically subject to the possibility of shifting its tracking so as to follow an undesired airplane if such airplane happens to fly exactly above or below the intended airplane so as to coincide simultaneously in both azimuth and distance. For the sake of economy and simplicity, moreover, it is contemplated to employ a comparatively simple form of notch followup device in the proposed system and, therefore, it is expected that this notch followup device will be subject to the above described change of tracking whenever some other airplane flies within approximately one-half degree of the exact azimuth of the observer's own plane and simultaneously within a certain critical distance zone extending from the observer's plane to 480 yards further out.

More important than the frequency of occurrence of mistracking is the question of its seriousness. In the system of the present invention, the occurrence of a mistracking of the notch followup device will constitute only an annoyance but not a hazard. In the first place, the pilot will see the representation of his airplane coming gradually closer to one of the other spots on the screen until they merge. At this time, no error has yet arisen. When the merged spot again divides so as to appear as two spots which gradually diverge, the pilot will be fully aware that there is a possibility of a wrong indication. If the divergence of the two spots occurs in such a way as to result in different azimuths, the error, if any, will be immediately corrected. If the planes separate only in respect to their radial distances, and if the notch follows the wrong one of the two airplanes, this will be immediately shown by a progressively increasing distortion of this RLS display. The reason for this is that the RLS display depends for its correct shape on the correct position of the notch followup device as previously mentioned.

Whenever an incorrect tracking of the notch followup mechanism is thus observed, the pilot can manually return the notch to its proper tracking by adjusting the system until the map assumes a correct form which can readily be observed by comparing it with the undistorted 3PR display shown on the same screen.

It is thus clear that the question of possible mistracking of the notch is primarily one of convenience and not a question of basic misinformation. In fact the system may be operated without any notch device at all, by arranging for the pilot manually to set the distance factor into the system each time he desired to read the RLS display.

To summarize the operation of the subcycle for the radio lighthouse system, energy is transmitted in the form of a sharp beam 69 from the transmitter 68. This transmitted energy then may be reflected from the various reflecting objects for reception on the various craft. Simultaneously with the transmission of the energy in beam 69, energy is transmitted in a plurality of pulses as shown at 70 for the purpose of initiating the sweep circuit on the separate indicating receivers. This pulse operates to produce a linear sweep for the indicator. Pulses 70 also are repeated by each of the craft carrying the repeaters and these repeated pulses are received on other craft to produce indications of the position of these craft. Thus, on the indicating receiver, for example on craft 71, there will be received the synchronizing pulses 70 starting the sweep circuit and the reflected energy at a wavelength of beam 69 as well as the reradiated energy from other craft. These reflected and otherwise reradiated pulses will be timed in accordance with the space position of these objects relative to the sweep circuit so that their position on an indicator will be clearly set forth.

For a more detailed understanding of the operation of the system, the actions of the major units of the transmitting equipment at the lighthouse, and of the receiving equipment in the observer's airplane will be described in detail in connection with Figs. 3 and 4 which are functional diagrams of transmitting and receiving equipments, respectively, such as may be used at stations 68 and 71. Since a complete cycle of rotation involves 1200 individual sub-cycles, each of which is initiated by the sending of one synchronizing pulse but may involve three successive complete transmissions and receptions, it is clear that only a small portion of a complete rotation cycle can be considered.

The timing chart of Figs. 1A, 1B, 1C shows sufficient sub-cycles to illustrate the action of the special reference or north signals which are sent out at the time the beam is sweeping through north, as well as to illustrate the action of the followup circuit in the observer's airplane which is energized only when the beam is sweeping through the 15° azimuth angle occupied by this airplane. In order to cover all these features of interest, these charts have been drawn to show sub-cycles 1, 2 which take place while the beam is passing through north, and sub-cycles 61, 62 which take place when the beam is sweeping through the 15° azimuth direction, as well as sub-cycles 66, 67 to cover a portion of the period after the beam has left the observer's airplane and is scanning another airplane in a slightly different azimuth.

A complete sequential tracing of all these sub-cycles would be unnecessarily lengthy and therefore. in the following description only cycles 66 and 67 will be traced in detail since these represent a typical general case where the beam is directed neither north nor toward the observer's own airplane (see Fig. 1C) but is aligned with one other airplane and one natural obstacle. After a complete tracing of these two cycles 66 and 67, the special features of other cycles will be briefly noted.

Figure 3:
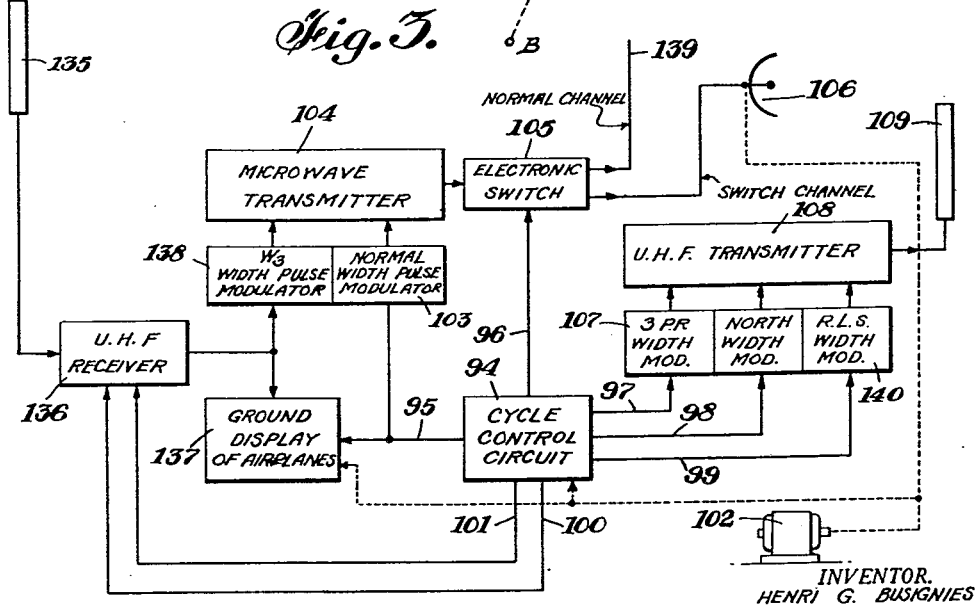
Fig. 3 is a block circuit diagram of a radio beacon transmitter system in accordance with my invention.

The cycle control circuit 94 of the transmitter station, Fig. 3, delivers control signals selectively over leads 95—100 to control the operation of various parts of the circuit. Control circuit 94 may be some form of cyclic switching circuit preferably under control of motor 102 which serves also to rotate beam 69. At the start of each typical 3PR sub-cycle except in the north position, control signals are delivered over leads 95, 96 and 101. The sub-cycle 66 has been chosen for specific consideration since it best illustrates the general principles. The control signals over lead 95 from circuit 94 triggers the normal pulse width modulator 103 of transmitter 104 thus causing this transmitter to send out a high power microwave pulse of normal width W (e. g. 1½ microseconds). The control signal over lead 96 conditions the electronic switch 105 for routing these pulses to the beam radiator 106 and a powerful microwave pulse is radiated in a narrow beam centered on an azimuth angle of 15¾ degrees. It is assumed, for purposes of description, that this beam is just 1° wide so as to just miss the observer's own airplane 71 (Fig. 1C) and the other two airplanes 74 and 75 in the 15° azimuth. It is assumed, however, that this beam just strikes another airplane 76 which is flying at about a 16° azimuth as illustrated in Fig. 1C.

At the same time that this microwave beam 69 is emitted from radiator 106 as above traced, the control signal on lead 97 operates pulse generator 107 and causes transmitter 108 to deliver a synchronizing pulse of width W2 of lower frequency UHF carrier which is omnidirectionally radiated by antenna 109, this pulse being shown in line 82 in the time-graph of Fig. 1C. The width of this pulse is chosen to characterize the cycle as a 3PR cycle.

Figure 4:
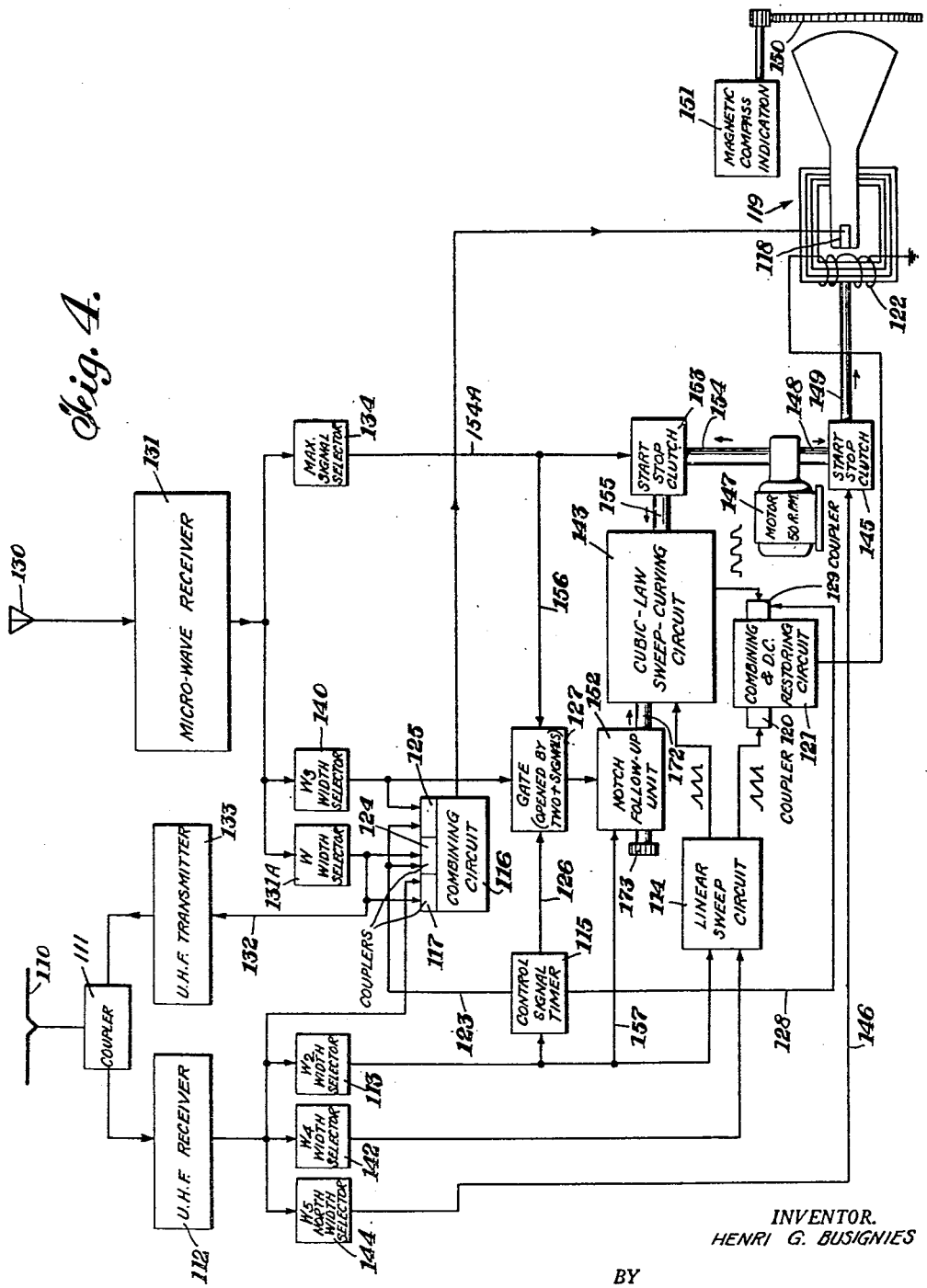
Fig. 4 is a block circuit diagram illustrating a repeating display receiver in accordance with my invention.

In the receiver of Fig. 4 on the observer's airplane, the microwave signal (which is assumed to miss this airplane) is not received, but the 3PR synchronizing signal of lower frequency is picked up by antenna 110, Fig. 4, and thence transmitted through coupler 111 to UHF receiver 112. From the output of this receiver 112, this 3PR synchronizing pulse passes through width selector 113 to start linear sweep circuit 114 and control signal timer 115. Incidentally, this signal also is applied to combining circuit 116 through coupler 117 and thence to the control grid 118 of oscilloscope 119 so as to cause a bright spot, but this is of no consequence since the beam has not yet started to move away from the center of the screen.

The signal applied to sweep circuit 114 causes generation of a linear sweep which passes through coupler 120 and combining circuit 121 to the deflection coil 122 of the oscilloscope 119, thus causing the beam to move linearly outward.

The signal applied to the control timer 115 causes the latter to deliver a number of blocking and gating signals which condition the circuit for 3PR type of operation as follows: Firstly, the blocking signal applied over line 123 to couplers 117 and 124 prevents this combining circuit 116 from passing during the next 800 microseconds any signals other than the special width W3 microwave signals characteristic of the three path operation applied over coupler 125. Secondly, the signal applied over line 126 to gate 127 prepares this gate to be opened by a maximum strength microwave signal such as would be produced if the beam were pointed at the airplane; since that is not the case during the present cycle, this signal applied to gate 127 is of no consequence. Thirdly, the blocking signal applied from timer 115 over line 128 to input coupler 129 of combining circuit 121 blocks the latter in so far as input 128 is concerned so that only the linear sweep waves from sweep circuit 114 can pass through this combining circuit to the deflection coils 122.

Thus, in response to the UHF synchronizing signal of width W2, the airplane receiving equipment merely commences a linear outward sweep of the oscilloscope beam and conditions itself to ignore all subsequent signals excepting these special microwave signals relied upon for the 3PR function.

Referring now to Fig. 1C, it will be noted that the high power beamed microwave pulse 83 strikes first the airplane 76 and next the mountain 72. The reradiations 85 which take place from the mountain as shown in the second picture of column 66, and in the time graph at the bottom of this column are of no effect because the receiving equipment is now in condition to display only the special width microwave signals 93. Airplane 76, however, will respond to the powerful beamed microwave pulse in the following manner (for the moment, the diagram of Fig. 4 may be considered as representing the equipment carried on airplane 76).

The circuits of the receiving equipment of airplane 76 receive both the powerful microwave signal and the 3PR UHF synchronizing signal substantially simultaneously: The 3PR synchronizing signal produces all the same effects above traced in connection with the observer's plane 71. The powerful direct beam radiation from the lighthouse is picked up by antenna 130 and is received by receiver 131 from which it passes through the normal width selector 131A over line 132 to trigger the UHF transmitter 133 thus producing a UHF response as indicated in the second picture in column 66 of Fig. 1C and at 82 on the corresponding time graph of this figure. It should be noted that the transmitter 133 requires a large voltage for triggering and, therefore, cannot be triggered by any but the direct pulse from the lighthouse which will be several thousand times higher in energy than the corresponding reflected pulses. The signal from microwave receiver 131 will also pass through the maximum signal selector circuit 134 to perform certain functions, but these will not be considered at this time since they do not have any relation to the response sent out by the airplane. The corresponding action of the observer's airplane 71 will later be described in connection with cycle 62.

Referring now to Fig. 1C, it will be seen that the response of the airplane 76 returns to the lighthouse 68, and there causes the emission of a special microwave signal 93 of width W3. The corresponding action takes place as follows in the diagram of Fig. 3. The arriving UHF response is picked up by antenna 135 and received by receiver 136 from which it is transmitted not only to a suitable ground display equipment 137 but also to the special width W3 pulse modulator 138 of transmitter 104. As a result, this transmitter 104 sends out a microwave pulse of special width, e. g. 2 microseconds. This pulse passes through the electronic switch 105, now in normal condition, to the circular pattern radiator 139 so as to travel outward in all directions as shown in Fig. 1C.

In the receiving equipment of the observer's airplane, this special microwave pulse is picked up by antenna 130, received in receiver 131 and delivered through the special width selector 140 and coupler 125 to the combining circuit 116. Although this circuit 116 is blocked in respect to its other inputs 117, 124, it is not blocked in respect to its input 125 and therefore forwards the signal to the intensity controlling grid 118 of oscilloscope 119. Accordingly, a bright spot is produced on the screen of this oscilloscope to represent the position of the airplane 76, as reported by the lighthouse 68.

Since the deflection coil 122 of this oscilloscope was energized by a linear sweep from 114 at the instant of arrival of the 3PR synchronizing pulse, the amount of radial deflection of this beam will, at this instant, correspond to the time delay between the arrival of such 3PR synchronizing pulse and the arrival of the special microwave signal. This time delay will be proportionate to the radial distance of the airplane 76 from the lighthouse as can be seen from the time graph of Fig. 1C; and therefore the spot now produced on the oscilloscope of the observer's airplane 72 will be correct with respect to the amount of radial deflection. With respect to the azimuthal correctness of this spot, the rotation of coil 122 is made substantially in synchronism with the rotation of the lighthouse beam so as to show this spot in the correct angular direction. The manner of insuring such synchronism will be described later.

The 3PR cycle is now essentially completed. After the end of an 800 microsecond interval, the timer 115 will remove the several blocking and gating signals which have temporarily conditioned the equipment for this form of operation, and the receiver will be ready to commence a new cycle.

The cycle control circuit 94, Fig. 3, delivers control signals over leads 95, 96, 99 and 100 at the start of each typical RLS sub-cycle such as shown in columns 1, 61 and 67 of Fig. 1C. The sub-cycle 67 has been chosen for specific consideration since it best illustrates the general principles. As before, the control signals on leads 95 and 96 cause the emission of a powerful beamed microwave pulse from radiator 106. The control signal over lead 99 also causes the simultaneous radiation in all directions from antenna 109 of a UHF synchronizing pulse, but in this case it is the RLS width modulator 141 of transmitter 108 which performs the triggering and therefore the pulse is of such width W4 as to signify the commencement of an RLS type of cycle. The control signal applied to lead 100 serves to block UHF receiver 136 for 800 microseconds, so as to prevent the emission from the lighthouse of the special microwave pulses which are required only in the 3PR cycles.

In the receiver of the observer's airplane 71, the RLS synchronizing signal is received by receiver 112 as in the previous case, but this time passes through width selector 142 instead of 113 since it has a width characteristic W4 of the RLS cycle. The output of width selector 142 starts the linear sweep circuit 114 in the same way as in the prior case but does not energize control timer 115. Accordingly, no part of combining circuit 116 nor of combining circuit 121 is blocked. Also, the gate 127 is not prepared for possible operation.

When the linear sweep circuit 114 commences to deliver a saw-tooth voltage to the combining circuit 121, it simultaneously delivers a similar voltage to the cubic-law sweep-curving circuit 143 and accordingly, the latter commences to deliver a suitable correcting voltage of curved characteristics which will be considered in greater detail later. This curved voltage output of circuit 143 is of such a form that when it is added to the saw-tooth sweep from circuit 114, with proper restoration of the D. C. axis, the resultant wave will be suitable for the sweep required in the RLS operation. Accordingly, the output of combining and D. C. restoring circuit 121 is applied to the deflection coil 122.

Referring now to Fig. 1C, it will be seen that the beam 69 representing the powerful microwave pulse travels outward so as to strike both the airplane 76 and the mountain 72. The airplane responds as before when struck by this beam, and as before, the mountain reflects some of the microwave energy striking it. Thus, a reflected microwave pulse and a lower frequency UHF response pulse are transmitted in all directions from the airplane and mountain, respectively, so as to be received by all other airplanes in the vicinity.

Since the airplane 76 is closer to the lighthouse 68 than mountain 72, its reradiated pulse will reach the observer's airplane 71 earlier than the reflected microwave pulse of the mountain. The reception of these pulses will, therefore, be considered in corresponding order.

When the repeated pulse from airplane 76 arrives at the observer's own airplane 71, it is picked up by antenna 110 and transmitted through coupler 111 to receiver 112 from which it passes to input coupler 117 of combining circuit 116 and thence to the intensity control grid 118 of the oscilloscope 119. Since the proper sweep voltage has been applied to the deflection coil 122, the radial deflection of the beam at this instant will be correct for representing the distance of the airplane 76 from the lighthouse 68. The deflection coil 122 rotating in proper synchronism with the lighthouse beam will assure correct azimuth indication. Thus, a spot shown on the oscilloscope will correctly represent the airplane 76 both in azimuth and radial distance.

A short time later, the reflected microwave energy from the mountain will arrive at the plane 71. This will be picked up by antenna 130, received in receiver 131 and delivered through width selector 131 to input coupler 124 of the combining circuit 116. Since no part of this combining circuit is now blocked, this pulse will pass through to the intensity-control electrode 118 of oscilloscope 119. As in the case of the repeated pulse from airplane 76, this pulse will also produce an indication which is correct in both distance and azimuth but which will generally be of somewhat lower intensity. By providing a separate volume control in the input couplers of circuit 116, signal representations of natural objects and passive repeaters may be adjusted to any desired brilliance, independent of the brilliance employed for the display of active repeaters and other airplanes by the RLS principle and also independent of the brilliance employed for the 3PR display.

In the foregoing description the 3PR and RLS operation was traced without explaining in detail all the features. For example, the synchronous rotation of coil 122 was assumed. How this synchronism may be accomplished will now be described.

Referring to Fig. 1A, it will be seen that when the beam of the lighthouse is sweeping through north, the successive cycles of this lighthouse are performed as usual, except that the regular 3PR synchronizing signal ordinarily transmitted at the start of each even sub-cycle is temporarily replaced by a slightly modified signal for characterizing the north orientation of the beam.

This special north synchronizing signal may be of a width W5 only slightly different from width W2 so it will pass through the width selector 113 of the receiving equipment, so that the 3PR cycle takes place in the same manner as usual. This special north signal, however, will also pass through width selector 144 so as to energize start-stop clutch 145 over line 146. Width selector 144 is made more selective than selector 113 so that pulses of width W2 will not be passed.

An accurate speed motor 147 with suitable gear reduction and speed control drives the input shaft 148 of clutch 145 at a speed very slightly faster than the beam rotation which has been chosen for illustration at 50 R. P. M. When the system is first put in operation, the motor will turn the input shaft 148 of clutch 145 but the output shaft 149 will not be able to rotate until this clutch is tripped by an electric impulse. The next time the lighthouse beam swings through north, the clutch will be tripped so as to permit the output shaft to make one rotation. Since the lighthouse beam is assumed to rotate at exactly 50 R. P. M., while the motor turns slightly above this speed, the output shaft of start-stop clutch will complete its cycle a few milliseconds before the beam of the lighthouse again reaches north and will pause for a correspondingly brief interval before it is again released to commence a new cycle. Thus, the output shaft 149 of clutch 145 rotates in substantial synchronism with the lighthouse beam and its angular position at every instant closely corresponds to that of the lighthouse beam.

In the particular arrangement illustrated, the output shaft 149 of clutch 145 is directly connected to magnetic deflection coil 122 so that a "fixed map" form of display will be produced, with the north direction on the scope in a fixed position with respect to the screen, e. g. always at the top of the screen. This form of indication has the advantage of being consistent with the fixed central representation of the lighthouse, which results naturally from the simple forms of 3PR and RLS displays. In order to show the heading of the plane, as well as its position on such "fixed map" display, a heading indicator 150 is provided. This may take the form of a transparent disc with a large number of arrows engraved lightly on its surface. This heading indicator dial 150 is rotated by a compass repeater 151 controlled by some sort of compass.

It is clear that a "self-orienting-map" form of display may be given if preferred by providing a differential gear train between clutch 145 and coil 122 and connecting compass 151 to this gear train. Then the indication would orient itself so that the top of the screen would correspond to the heading of the airplane. In such case, the north direction would be shown on the screen by a dial like 150 or by other suitable means.

In order to produce radio lighthouse indications it will be recalled that the sweep circuit at the indicator must take into consideration the distance C indicated in Fig. 2. Since the receiver is normally on a moving craft this distance must be continuously determined. In accordance with my invention, when the beam of the lighthouse 68 actually sweeps over the observer's airplane 71, certain additional steps are performed for the purpose of determining the airplane's self-position. One of these special operations, the determination of self-azimuth, is performed during every sub-cycle. The other special operation, the determination of self-distance, is performed by the notch follow-up unit 152 which is actuated only during the even sub-cycles. A description of sub-cycle 62 will, therefore, serve to illustrate both these operations.

In general, sub-cycle 62 takes place like any other 3PR sub-cycle, described in connection with sub-cycle 66. Because of the fact that the powerful beamed microwave pulses directly from the lighthouse strike the airplane during this cycle, certain additional actions take place.

When such a powerful microwave pulse arrives at the observer's plane, it is picked up by antenna 130 and received by receiver 131. From the output of this receiver, the powerful pulse passes through width selector 131A to trigger transmitter 133 thus causing the emission of a response signal, as previously described. Aside from producing this response, however, two other important effects are produced in the observer's airplane. One of these effects provides a determination of self-azimuth and the other provides a determination of self-distance.

For the purpose of self-azimuth determination, the powerful pulse from receiver 131 is applied to maximum signal selector 134 which is biased to select only the most powerful of the pulses delivered during one complete rotational cycle. From the output of this selector 134, the pulse is delivered to start-stop clutch 153 over line 154A. This start-stop clutch is similar to clutch 145 previously referred to and is driven by the same motor 147. The output shaft of 154 is, therefore, synchronized in essentially the same manner as the output shaft 148, excepting that the reference point for the synchronization is not the instant when the lighthouse beam passes north, but rather the instant when this beam sweeps over the observer's airplane. Thus, the angular position of the output shaft 155 of this clutch 153 constantly corresponds with angle $p$, Fig. 2. Since the angle $p$ is one of the parameters required in the case of RLS operation, the rotation of this shaft is suitable for application to the cubic-law sweep-curving circuit 143.

The other parameter required by this sweep-curving circuit 143 is the radial distance of the observer's airplane from the lighthouse. This parameter also is obtained during the brief period when the lighthouse beam is sweeping past the observer's airplane. Only the 3PR type of cycles occurring during this interval are employed, thus greatly reducing the number of pulses applied to the notch follow-up 152 so as to improve the operation of the latter.

In order to thus pass only the special microwave pulses emitted from the lighthouse during the instants of alignment of the main sweep of the observer's own airplane, gate circuit 127 is provided which opens only when it simultaneously receives signal voltages from control signal timer 115 and maximum signal selector 134 applied over branch line 156. Since the selector 134 delivers signals only when the strong pulses of the direct beam strike the airplane, while timer 115 delivers its gating and blocking control signals only during cycles of the 3PR type, it will be clear that gate 127 will pass only the maximum pulses occurring during the 3PR interval. Extra security is provided by the special width selector 140 which will pass only the special microwave pulses of width W3.

Referring now to Fig. 1B, it will be seen that the only special microwave signals 90—92 which are received simultaneously with the direct powerful microwave pulses 83 are the signals shown in column 62 which represent the radial positions of the three airplanes assumed to be located at azimuth angle 15. In the receiver equipment of Fig. 4, therefore, the only pulses which can pass from receiver 131 through the special width selector 131A and gate 127 are the three successive pulses representing the radio positions of these three airplanes.

To provide the necessary reference pulse for the notch follow-up circuit, the synchronizing pulse from the output of width selector 113 is delivered to this unit 152 over line 157.

Figure 6:
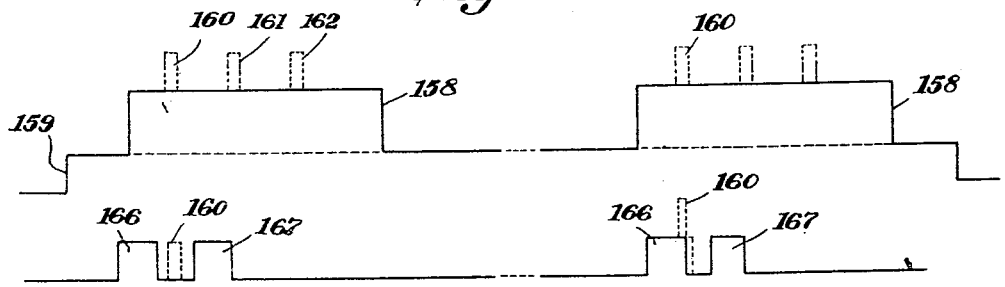
Fig. 6 is a set of curves used in explaining the operation of the circuit of Fig. 5.

The control signal timer pulses applied to gate circuit 127 over line 126 are timed with the synchronizing pulses of width W2. These pulses are medium length rectangular pulses 158 of Fig. 6. These pulses 158 occur only during the time when the sharp directive radiation is being keyed for the three-path radar operation so that only the pulses occurring during this time interval of the sub-cycle will be present while these keyed pulses are being applied to gate 127. Furthermore, the maximum selective circuit 134 shown in Fig. 4 also will produce a controlling pulse only during the relative narrow interval when the microwave beam is directed toward the indicating receiver. This pulse while relatively short with respect to a complete rotation cycle is quite long with respect to pulses 158 and may be represented at 159 of Fig. 6. These two positive pulses 158 and 159 serve to bias gate circuit 127 to pass the received signal pulses incoming from width selector 140. As shown in Fig. 6, there are three such pulses 160, 161 and 162. For the purposes of the notch gate system, it is desired that only one of these three pulses be selected to the exclusion of the others.

Figure 5:
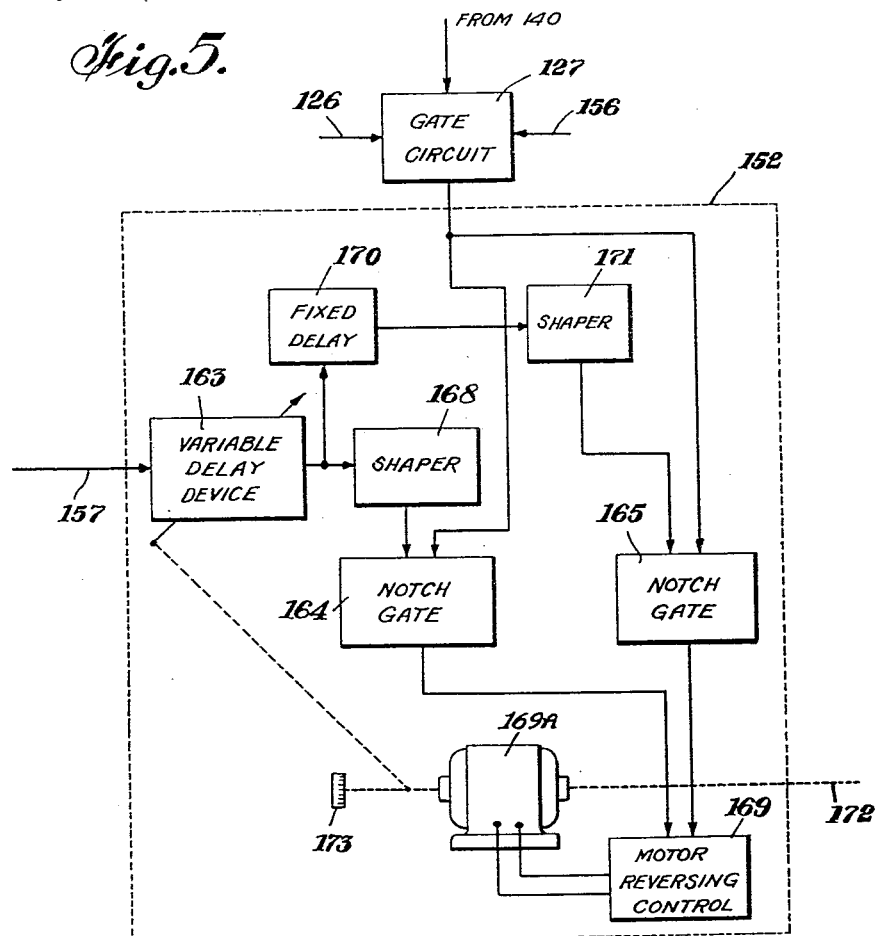
Fig. 5 is a circuit diagram illustrating the notch follow-up circuit shown as a part of the diagram of Fig. 4.

If it is assumed that pulse 160 is the repeated pulse corresponding to the transmission from the observer's plane, this pulse should be selected. In order to secure this selection and to have the device follow it up so as to maintain the indication in a position representative of distance, the notch follow-up unit 152 is provided. As shown in Fig. 5, the selected synchronizing pulses of width W2 may be applied over line 157 to a variable delay device 163. This variable delay device is driven by a motor 169A which rotates to advance the delay of the variable delay device one-half the width of the selected pulse 160 for each normal rotation of the radio beacon, when driven in one direction and retard the delay one-half this distance when driven in the other direction. The selected pulses 160 therefore are caused normally to fall between two control pulses applied to notch gate circuits 164, 165.

These gate control pulses are shown in Fig. 6 at 166 and 167. Pulses 166 and 167 may be derived directly from the incoming pulses. The output of the variable delay device 163 which may, for example, be a trigger circuit of the multivibrator type, will generally be relatively wide pulses with sloping sides. In order that they may be used properly for control, these pulses must be narrowed down preferably to a width less than the normal separation that is to be maintained between craft using the system. It will be clear, however, that these pulses should be sufficiently long in time duration so that the craft will not pass beyond such a pulse in two or three seconds of time. This is desirable since, should the signal fade for two or three revolutions of the lighthouse transmitter, the craft might pass completely beyond the notch gate control unit and so the follow-up could not be properly performed. Accordingly, the pulses from the output of delay device 6 are passed through a shaper network 168 which serves to reshape these output pulses and narrow them down. These output pulses from 168 are applied to notch gate 164 so as to bias it sufficiently positive to pass any pulses applied thereto. Thus, any output pulses from gate circuit 127 which occur during the application of pulse 166 to notch gate 164 will therefore be passed on to the motor reversing control mechanism 169.

Output pulses from delay device 163 are also applied over a fixed delay circuit 170 to a second shaper circuit 171 and from there to notch gate 165. These pulses correspond to 167 shown in Fig. 6 and are delayed sufficiently to provide a time gap greater than the width of output pulses from gate circuit 127. Pulses from 127 are also applied to notch gate 165 and, if they are applied during the interval when pulses 167 are present, from there to motor reversing control 169 to cause motor 169A to operate one revolution in the opposite direction to that produced by pulses from notch gate 164. It will therefore be seen that as long as pulse 160 is properly timed with respect to pulses 166 and 167 that the motor 169A will remain stationary and its shaft 172 will correspond in angular position to the distance of the receiver from the radio lighthouse station. However, as the craft carrying the receiver moves, the pulse 160 may be displaced to one side as shown in the right hand side of Fig. 6 causing pulse 160 to overlap pulse 166. This increased voltage will be passed through notch gate 164 and applied to the motor reversing control causing motor 169A to operate in one direction for one revolution. This will displace the variable delay device sufficient to move the notch gate pulses 166 and 167 over one-half the width of pulse 166. Accordingly, if the craft does not move the next revolution of the beacon, the pulse 160 will again fall within the notch and the shaft will remain stationary. However, if the craft continues to move in distance tending to displace pulse 160, the gate pulses 166 and 167 will tend to follow it up so as to maintain shaft 172 at all times substantially aligned with the distance indication.

The notch gate pulses 166 and 167 are initially lined up by means of a manual control knob 173. This knob may be controlled in position by observation of the indications produced on the indicator 119, adjustment being made until such time as the indications properly coincide with the position on the map. It will be clear that if desired the entire notch follow-up unit may be eliminated and manual adjustments made for every reading that is to be taken. This, however, entails rather tedious observation of the instrument and does not permit such rapid operation as is desired.

If no fading of the signal need be anticipated the notch gate system may be considerably simplified. With such an arrangement only one notch gate pulsing circuit need be provided instead of the two shown in Fig. 5. Motor 169A may then be made normally to advance the notch one-half the width of the applied pulses for each rotation of the beacon. Should a pulse fail to appear on the notch gate, the motor may then be caused to rotate backwards one revolution thus stepping the delay device back one step. This would thus keep shaft 172 hunting a small distance back and forth across the receiving distance. However, the use of a single pulse would also permit the distance measurements to be made more accurately so that less separation between craft in the same azimuth direction could be tolerated.

In the foregoing description of the RLS type of operation, the manner of operation of the sweep curving circuit 143 of Fig. 4 was not described, but it was merely assumed that this circuit produced the necessary correcting voltage under control of shafts representing angle $p$ and distance $C$ respectively, Fig. 2. The required correcting voltage was then described as being combined in circuit 121 with the linear saw-tooth sweep voltage from sweep circuit 114. The combining circuit 121 was also assumed to properly restore the zero axis in known manner. The resulting output in circuit 121 was then assumed to correspond to the required cubic-law sweep-voltage.

In order to consider more specifically the manner of attainment of these sweep voltages, the trigonometric relationships of Fig. 2 will be considered. In the triangle whose sides are C, M and P, and whose opposite angles are $c$, $m$ and $p$, respectively, the usual cosine law for determination of one side (in terms of the other two sides and the angle included between them) may be written as follows:

$$P = \sqrt{C^2 + M^2 - 2CM \cos p}$$

if D represents the difference between the paths of the direct pulse from L to A and the indirect pulse from L via O in Fig. 2, it is clear that $D = P + M - C$; and if $\Delta$ is the corresponding observed delay between the arrivals of the direct and indirect pulses $$\Delta = (P + M - C) \div v$$

(where $v$ is the velocity of propagation in miles per microsecond, i. e. approximately .186). From the definitions of D and $\Delta$, it is clear that $$P = C + D - M = C + v\Delta - M$$

Substituting this value for P in the original equation, we obtain $$C + v\Delta - M = \sqrt{C^2 + M^2 - 2CM \cos p}$$

This equation may be solved for M to yield $$M = \tfrac{1}{2} v\Delta (v\Delta + 2C) \div (v\Delta + 2C \text{ hav } p)$$

This is the basic cubic equation which determines the shapes of the sweep curves, since it defines the radial distance M of any obstacle with respect to the lighthouse in terms of the airplane's own radial distance C, the readily measurable angle $p$ and the observed pulse delay $\Delta$. This equation, however, expresses the distance of the object directly in miles.

In order to determine the corresponding deflection voltage required, it is necessary to assume a scale factor S which may be defined as the number of volts which must be applied to the oscilloscope indicator unit in order to produce the amount of deflection which is desired for representing one mile distance. If it is desired, for instance, to employ a scale of three miles to the inch, and if the sensitivity of the indicator is such that 30 volts are required for one inch of deflection, the factor S would correspond to 10 volts per indicated mile. Inserting this scale factor S in the last derived equation, this may be written $$SM = \tfrac{1}{2} Sv\Delta (v\Delta + 2C) \div (v\Delta + 2C \text{ hav } p)$$

Since SM is the deflection voltage which must be applied to the oscilloscope indicator at the instant when the reflected pulse from the obstacle O is received, (i. e. the deflection voltage required $\Delta$ microseconds after the commencement of the cycle) it is clear that this equation defines the voltage-time relationship required for the cubic-law sweep. This equation may be rewritten in the form $$SM = [\tfrac{1}{2} Sv\Delta] - \left[\frac{1}{\tfrac{1}{2} Sv\Delta + SC \text{ hav } p}\right] \times [\tfrac{1}{4} S^2 C^2 \sin^2 p] + \left[\frac{\tfrac{1}{4} S^2 C^2 \sin^2 p}{SC \text{ hav } p}\right]$$

This latter form of the equation most clearly represents the manner in which the desired voltages are produced.

Considering the four terms shown in squared brackets, it will be clear that the first term represents merely a linear sweep such as the output of circuit 114 in Fig. 4. The second bracketed term is a fraction whose denominator consists of this same linear sweep voltage plus a constant voltage dependent upon distance C and angle $p$. The third bracketed term is a multiplying factor depending again upon C and $p$. The fourth bracketed term is equal and opposite to the value of all the rest of the equation at the start of the cycle (i. e. when $\Delta = 0$). Thus, this fourth bracketed term represents merely a D. C. restoring action, or shift of axis sufficient to bring the starting value of the whole sweep voltage to 0.

Referring to Fig. 7, the circuit elements shown within the dot-dash lines represent one possible form of sweep-curving circuit which may be employed for unit 143 of Fig. 4. The shafts 172 and 155 entering this unit in Fig. 4 are again shown in Fig. 5.

The potentiometers 174, 175 and 176 are endless potentiometers whose sliders 177, 178 and 179 can turn continuously in one direction and whose windings 180, 181 and 182 form closed arcs tapped at two diametrically opposite points. Potentiometer 176 may be a low resistance potentiometer having such a taper as to deliver over line 183 a voltage proportionate to SC when its shaft 172 is maintained at an angle corresponding to the distance C. Potentiometer 174 has a much higher impedance winding tapered so as to produce a voltage dividing action proportionate to the haversine of the angle assumed by its control shaft 155. The bias voltage SC hav $p$ from the output of potentiometer 174 is added to the saw-tooth sweep voltage arriving from circuit 114 by means of a simple diode-and-condenser circuit 184, 185 of the type usually used for D. C. restoration, thus resulting in a voltage $$\tfrac{1}{2} Sv\Delta - SC \text{ hav } p$$

The only element of the circuit requiring special comment is the tube 186 which is a cathode ray type of tube having a target electrode 187, somewhat similar to the known "monoscope" tubes employed for television testing. This type of tube can be designed to produce any desired functional relationship between the output voltage delivered by the target electrode and the deflected position of the cathode ray beam. Ordinarily, these tubes are arranged to give two-dimensional patterns. In the present application, the tube is arranged to yield an output voltage which varied according to a reciprocal law with respect to the deflection voltages applied to one pair of deflection plates 188. The other deflecting plates 189 could be left at fixed potential so that the cathode ray beam would sweep across a single line of the target. Preferably, however, a beam spreading oscillation from oscillator 190 is applied to these other plates 189 so as to spread the beam out into a wide flat fan which could be swept across the target under the control of the combined voltages of potentiometer 174 and sweep circuit 114.

The output from the target of monoscope 186 is amplified in a stabilized amplifier 191 whose gain is accurately varied by the shaft 172 so as to maintain this gain equal to $S^2 C^2$. The attenuating potentiometer 175 may be tapered to provide a transmission factor proportionate to $\tfrac{1}{4} \sin^2 p$.

The output from the complete cubic-law sweep-curving circuit 143 above described may now be combined with the saw-tooth sweep from circuit 114 of Fig. 4 in a combining and D. C. restoring circuit 121; and the resultant voltage delivered will be of the proper form for application to an electrostatically controlled oscilloscope. For magnetically controlled oscilloscope operation, a power amplifier 192 with suitable pre-distortion to compensate for the inductance of the deflection coil 122 is incorporated in the output circuit in well known manner.

The circuit of Fig. 8 showing a typical width selector which may be used preferably includes a limit clipping stage 193 as an input coupler which limits all input pulses to substantially the same amplitude. Should the input pulses be of a positive polarity as indicated by the pulses of curve 9a in Fig. 9, the coupler stage 193 also serves to reverse the polarity as indicated by the pulses of curve 9b. This output pulse energy from stage 193 is applied through a resistor R to a shock excitable L-R circuit 195. Connected across the tunable circuit 195 is a vacuum tube 196, the cathode 197 of which is connected to the input side of the circuit 195, while the anode 198 is connected to the opposite side 199 of the tunable circuit. The side 199 is also connected to a source of anode potential 200. The pulse energy, curve 9b, from the anode connection 194 is applied to the grid of tube 196 so as to block the conduction between the cathode 197 and the anode 198 while pulse energy is applied to the circuit 199. The undulations produced in the circuit 199 in response to pulse energy over anode connection are taken off through a connection 201 for application to a threshhold clipping amplifier stage 202. The bias on the grid 203 is controlled by adjustment of resistor 204. In the output 205 of stage 202 is a pulse width shaper 206 the operation of which is hereinafter described.

Assume for purposes of illustration, that the widths of the pulses of curves 9a and 9b correspond, respectively, to different channels W1, W2, W3, W4 and W5. Assume also that the circuit 195 is tuned for selection of pulse width W3. Curve 9c represents the output of the circuit 195 when this circuit is tuned for selection of pulse width W3, illustrating the different output undulations for the different pulse width of curve 9b. When the leading edge 207 of the pulse W3 is applied at negative polarity circuit 195, an initial undulation 208 is produced which is normally followed by undulations 209, 210 and so on in the form of a damped wave. When the circuit is tuned to a frequency the period of which is exactly twice the width W3, the trailing edge 211 occurs where the initiated oscillatory energy crosses the zero axis from undulation 208 to undulation 209. Since the trailing edge 211 shock excites the circuit in the same direction at this point, the undulation 212 produced thereby in the circuit 195 adds algebraically to the undulation 209 to produce undulation 213. The next succeeding pairs of undulations produced by the leading and trailing edges of pulse width W3 would normally tend to produce a negative undulation 214 which would continue as a damped wave as indicated at 215. The damping tube 196, however, eliminates the trailing oscillations so that they do not interfere with the undulations produced by subsequent pulses applied to the circuit 195.

A pulse width less than pulse width W3 such, for example, as pulse widths W1 and W2, will not produce maximum undulations as great as the undulation 213 for the tuning adjustment corresponding to pulse width W3. This is illustrated by the undulations 216 and 217 produced in response to the pulse width W1 and W2, respectively. The reason for this is readily apparent because the shock excitations produced by the leading and trailing edges of the pulses of lesser width than W3 are in part opposed to each other as indicated by the broken lines associated with the undulations 216 and 217. The undulations 218 and 219 produced in response to the greater pulse widths W4 and W5 are likewise smaller than the undulation 213 since here again the oscillations produced in response to the leading and trailing edges of the greater pulse widths are in part opposed to each other so that the algebraic summation thereof is less than in the case of the undulations produced in response to pulse width W3.

The threshold clipping stage 202 is adjusted to clip at a level 22 thereby obtaining and amplifying the crest portion 213A of the undulation 213 as indicated by curve 9d. The pulse shaper 206 is preferably of the character adapted to differentiate the pulse 213a producing the pulse shape 213B of curve 9e. The shaper also includes a clipper stage for clipping the positive pulse portion of pulse shape 213B at level 221 thereby producing a narrow width pulse 213C synchronized in time to the pulse width W3. It will be apparent that by adjusting the tuning of circuit 195 to another frequency the period of which is twice the duration of any one of the other pulse widths of curve 9b, that a corresponding output pulse will be produced representing the pulses of the pulse width selected. If two pulses differing little in width from one another are to be passed by the same width discriminator then the clipping level 220 may be adjusted to select the two corresponding undulation peaks which will differ little in amplitude.

Figure 10:
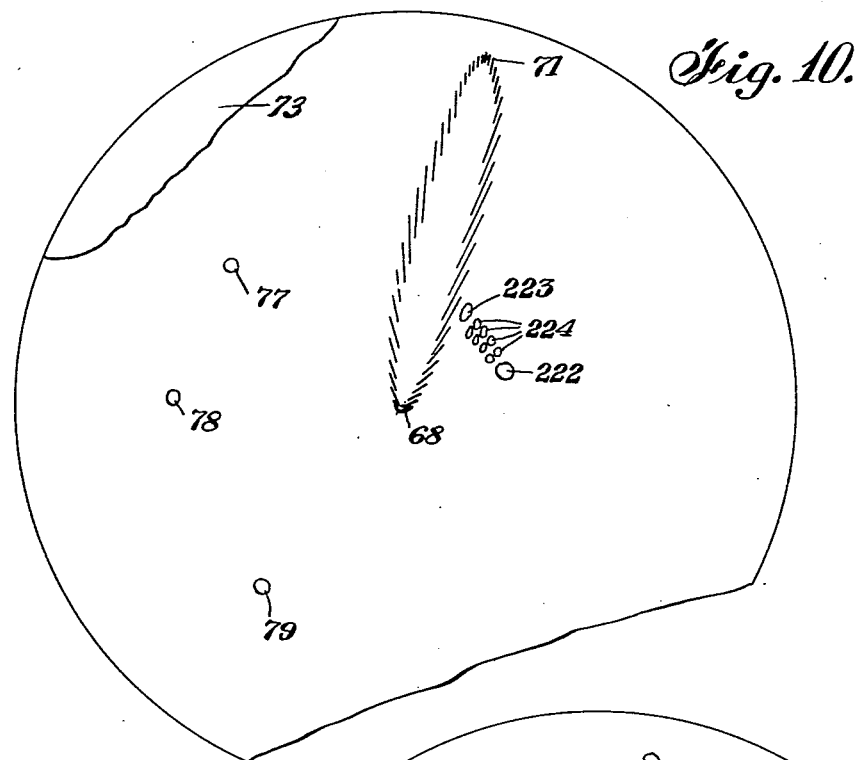
Figs. 10 and 11 are illustrative diagrams of the oscilloscope patterns traced by the radio lighthouse and three-path radar display circuits respectively.
Figure 11:
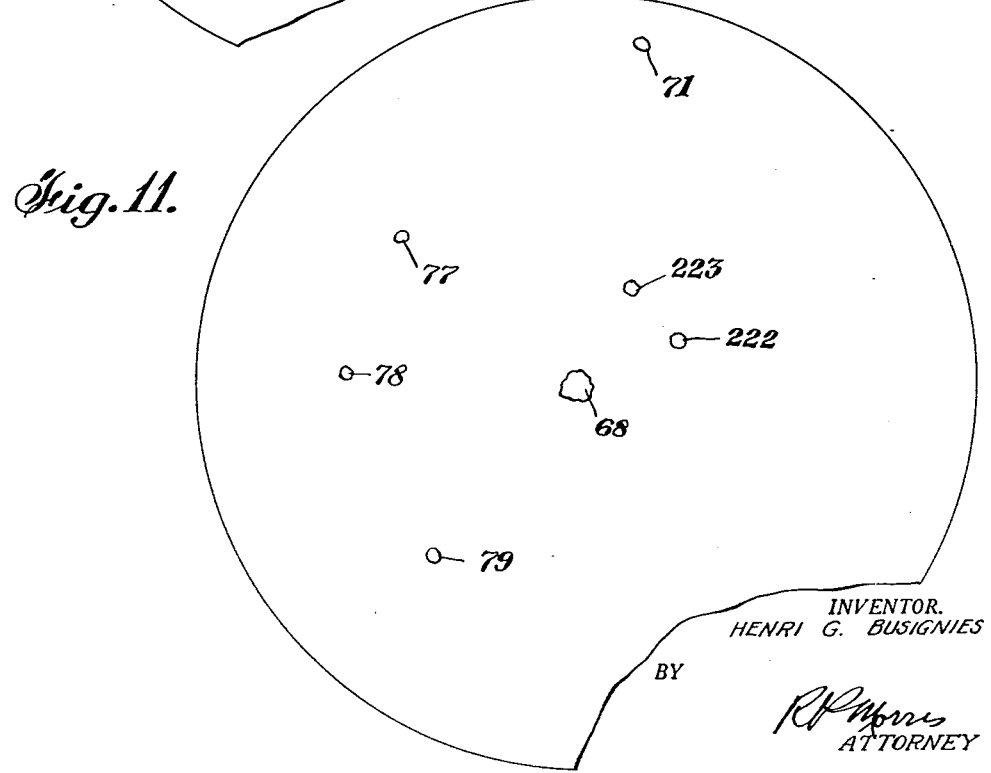

The displays on the cathode ray oscilloscope screen will be of the form shown in Figs. 10 and 11. Fig. 10 illustrates the RLS type of display, while Fig. 11 illustrates the corresponding 3PR display.

For the sake of simplicity, the number of features to be shown has been reduced to the minimum. The geographical conditions are assumed to be the same as those shown in the pictures of Fig. 1, but it is assumed that the equipment has been adjusted for a large scale display, covering a relatively short radius around the lighthouse. Thus, the large hill 72 and the three planes 74, 75 and 76 flying outside of this radius are not represented and only the observer's airplane 71, three other airplanes 77, 78, 79, a portion of the smaller hill 73, two active ground repeaters 222, 223 marking the ends of the runway, and eight parasitic repeaters 224 marking the boundaries of such runway are represented in Fig. 10. It will be understood, however, that switching arrangements will be provided which will enable the pilot to shift to a smaller scale representation covering a larger area when this is desired.

The representations of the hill 73 and the passive repeaters 224 may be controlled in brilliance separately from the other representations, i. e., airplanes and active repeaters. Thus, if desired the hill and passive repeaters may be dimmed down to make the airplanes and active repeaters stand out more strikingly. If desired, the repeaters could be flashed to distinguish them from the airplanes, but even without this, the airplanes could be distinguished by their motion.

The lighthouse 68 is represented by the crescent shaped bright spot at the center of the screen, while the observer's plane 71 is shown as a bright spot at the other end of the faint feathery ellipse shown in Fig. 10. This feathery ellipse represents the blind spot previously mentioned in section 1, which is inherent in the RLS type of display. A hazy ellipse joining the lighthouse and the observer's receiver will ordinarily be seen, although its brilliance may become vanishingly low half-way between the two ends. Inside this ellipse no representations of any obstacles or any airplanes can be seen by the RLS principle.

The 3PR type of display illustrated in Fig. 11 provides a very satisfactory method of eliminating the blind spot of the RLS display just discussed. Since this 3PR display is essentially like a retransmitted radar, but with the weaker pulses and half tone effects eliminated, its only blind spot is the normal small circular splash in the center of the screen which represents the position of the lighthouse 68. All airplanes 77, 78, 79 flying outside of this center splash will be clearly shown, perhaps with even higher definition than the representations of the RLS display.

The one important shortcoming of the 3PR type of display when used alone, is that it gives no positive indication as to which is the observer's aircraft. Thus, a pilot looking at the representation of Fig. 11 alone, would not be able to determine simply and with certainty which of the spots represented himself. By combining the indications of Figs. 10 and 11 on one screen, however, the principal disadvantages of both types of displays are eliminated. In addition, several other valuable advantages result.

In the first place, it becomes much easier for the pilot to notice immediately any distortion of the indications of the RLS display, since the two types of displays are superposed and thus, distortion of one results in a very noticeable lack of registry. It has been stated that one of the most basic reasons for selecting the RLS principle as a basis for a flying aid, is the fact that any mal-functioning of any part of the system will necessarily result in a distortion of the display. It would be possible to check such distortion by comparing the display of Fig. 10 with a printed map, showing the lighthouse, the mountain, the two ground repeaters and the passive repeaters which outline the runway. (In practice, of course, many more representations of each of these kinds would be present.) This, however, would require the superposition of the map upon the screen in order to make it reasonably convenient.

The two displays could be shown alternately at intervals corresponding to the rotation of the lighthouse beam (e. g. about 50 times per minute), but in the present proposal, it is assumed that these two displays are interleaved at the pulsing rate of 1200 times a second so that they appear to be simultaneously present.

While I have described above a particular example of a system in accordance with my invention, it is to be understood that this is given merely by way of example. Many modifications in the transmitting system and the receiving system as well as modifications in the indicating instruments used therewith will be readily apparent to those skilled in the art. Furthermore, while I have specifically described pulse modulation of different widths for the purpose of distinguishing the different signals, it will be apparent that other distinguishing characteristics may be used such as amplitude or frequency if desired. Moreover, the several transmitting functions utilizing separate antennas may be combined on a common antenna with the proper switching arrangements if such a structure is considered more desirable.

The specific example given is made merely by way of illustration and should not be considered as a limitation on my invention as set forth in the objects thereof and in the accompanying claims.

I claim:

1. A radio indicating system comprising a radiant energy pulse radiator and an indicator at a location, a first means selectively responsive to the two-way travel time of energy pulses from the indicator location to reradiating objects for producing on said indicator indications of the relative positions of said indicator and said objects, a second means responsive to energy reradiated from said objects in response to energy initially radiated from a transmitting source spaced from the indicator position for producing on said indicator other indications of the relative positions of said indicator and said objects, and means for alternately rendering said first and second means effective.

2. A distance indicating system comprising a first station, means for transmitting a first signal having a given characteristic in a directive radio beam from said first station, means for rotating said directive beam at a predetermined rate, means for receiving energy from said directive beam at a second station, means for repeating said received energy with a different characteristic, means for receiving said repeated energy and transmitting from said first station a second signal, and means at said second station responsive to said first and second signals for indicating the distance between said stations.

3. A distance indicating method for indicating the distance between a first and second station comprising transmittting a first signal having a given characteristic in a directive radio beam from said first station, rotating said directive beam at a predetermined rate, receiving energy from said directive beam at said second station, repeating said received energy with a different characteristic, receiving said repeated energy at and transmitting from said first station a second signal, and indicating the distance between said stations at said second station in response to said first and second signals.

4. A distance indicating system comprising a first station, means for transmitting a first signal having a given characteristic in a directive radio beam from said first station, means for rotating said directive beam at a predetermined rate, a second station, means for receiving energy from said directive beam at said second station, means for transmitting a second signal in response to said received energy, means for receiving said second signal at said first station, means for transmitting a third signal in response to said received second signal, and means at said second station responsive to said first and third signals for indicating the distance between said stations.

5. A distance indicating system comprising means for transmitting a first radiant energy signal from a given location, means for receiving said signal at a second location, means for transmitting a second radiant energy signal from said second location in response to said received first signal, means for receiving said second signal at said first location, means for transmitting a third radiant energy signal from said first location in response to said received second signal, means for receiving said third signal at said second location, and means for producing a distance indication at said second location in response to the transmission of said second signal and the receipt of said third signal.

6. A distance indicating method comprising transmitting a first radiant energy signal from a given location, receiving said signal at a second location, transmitting a second radiant energy signal from said second location in response to said received first signal, receiving said second signal at said first location, transmitting a third radiant energy signal from said first location in response to said received second signal, receiving said third signal at said second location, and producing a distance indication at said second location in response to the transmission of said second signal and the receipt of said third signal.

7. A position indicating system comprising means for transmitting a first radiant energy signal from a given location, means for receiving said signal at a second location and at a plurality of other locations, means for transmitting second radiant energy signals from said second location and said other locations in response to said received first signal, means for receiving said second signals at said first location, means for transmitting a plurality of third radiant energy signals from said first location in response to said received second signals, means for receiving said third signals at said second location, and means for producing position indications at said second location in response to the transmission of said second signal from said location and the receipt of said third signals.

8. A radio indication transmission system for use with repeating reradiators, comprising means for transmitting energy at a first radio frequency in a sharply directive pattern, means for rotating said pattern at a predetermined speed, a second means for transmitting energy at a second radio frequency in an omnidirectional pattern, means for modulating said second radio frequency energy with a characteristic signal when said pattern is in a given reference direction, means for alternately modulating said second radio frequency energy with different synchronizing signals, means for modulating said first radio frequency energy with pulses of predetermined characteristics simultaneously with modulation of said second radio frequency energy with one of said synchronizing signals, and means for transmitting said first radio frequency energy omnidirectionally and modulated with pulses representing repeated received energy from said repeating reradiators during the interval of transmission of another of said synchronizing signals.

9. An indicating receiver system for use with a radio transmitter as set forth in claim 8, comprising means for receiving energy at said first radio frequency, an indicator having a sweep circuit, means for receiving energy at said second radio frequency, means for selecting said characteristic signal, means for producing an indicating sweep in a given parameter synchronized with the rotation speed of said pattern in response to said separated signal, means for receiving said pulses of said predetermined characteristic, means responsive to said received pulses for transmitting repeated pulses, means for selecting the energy of the first radio frequency representing repeated received pulses, means for producing indications on said sweep indicative of the time position of said selected pulses, means for producing a distance indication in response to the transmission time of said repeated pulses and the reception of said repeated received pulses, means responsive to the synchronizing signals and said received pulses for modifying said sweep in a second parameter to provide distance simulation, and means for producing the indications on said indicator in response to the received signal incoming at said first radio frequency.

10. A radio indication transmission method for use with repeating reradiators comprising transmitting energy at a first radio frequency in a sharply directive pattern, rotating said pattern at a predetermined speed, transmitting energy at a second radio frequency in an omnidirectional pattern, modulating said second radio frequency energy with a characteristic signal when said pattern is in a given reference direction, alternately modulating said second radio frequency energy with different synchronizing signals, modulating said first radio frequency energy with pulses of predetermined characteristics simultaneously with the modulation of said second radio frequency energy with one of said synchronizing signals, and transmitting said first radio frequency energy omnidirectionally and modulated with pulses representing repeated received pulses during the interval of transmission of the other of said synchronizing signals.

11. A radio indication system comprising a first station at a given location, means at said first station for transmitting energy at a first radio frequency in a sharply directive pattern, means for rotating said pattern at a predetermined speed, a second means at said first station for transmitting energy at a second radio frequency in an omnidirectional pattern, means for modulating said second radio frequency energy with a characteristic signal when said pattern is in a given reference direction, means for alternately modulating said second radio frequency energy with different synchronizing signals, means for modulating said first radio frequency energy with pulses of predetermined characteristics simultaneously with modulation of said second radio frequency energy with one of said synchronizing signals, a second station spaced from said transmitter means, means at said second station for receiving energy at said first radio frequency, means at said second station for receiving energy at said second radio frequency, means for separating said characteristic signal, a sweep circuit for producing an indicating sweep in a given parameter synchronized with the rotation speed of said pattern in response to said separated signal, means at said second station for receiving said pulses of said predetermined characteristic, means responsive to said received pulses for transmitting repeated pulses, means at said first station for transmitting said first radio frequency energy omnidirectionally and modulated with pulses representing said repeated pulses during the interval of transmission of the other of said synchronizing pulses, means at said second station for selecting the pulses from the omnidirectional received energy of said first radio frequency energy, means for producing indications in said sweep indicative of the time position of said selected pulses, means for producing a distance indication in response to the transmission of said repeated pulses and the reception of said omnidirectionally received pulses, means responsive to the synchronizing signal and said received pulses for modifying said sweep in a second parameter to provide distance simulation, and means for producing the indications on said indicator in response to the received signal incoming at said first radio frequency.

12. A radio signal station comprising a first transmitter, an omnidirectional radiator, a directional radiator, means coupled between said transmitter and said radiators for selectively coupling said transmitter to said radiators, first and second signal means for modulating the energy of said transmitter with signals of first and second identifying characteristics respectively, a receiver, means for coupling the output of said receiver to said first signal means to render said signal means operative in response to received energy, a second transmitter, an omnidirectional radiator coupled to said second transmitter; third, fourth and fifth signal means coupled to said second transmitter selectively to modulate the energy thereof with signals of third, fourth and fifth identifying characteristics, a cycle control circuit and means for rotating said directive radiator at a predetermined rate and for simultaneously controlling said cycle control circuit to cyclically control said signal means.

13. A system according to claim 12, further comprising indicator display means, means for controlling said indicator display means in accordance with the rotary position of said directional antenna, and the transmission of signals from said second signal means, and means responsive to energy from said receiver for producing display indications on said display means.

14. A radio signal station comprising a first transmitter, an omnidirectional radiator, a directional radiator, electronic switch means coupled between said transmitter and said radiators for selectively coupling said transmitter to said radiators, first and second signal means for modulating the energy of said transmitter with signal of first and second identifying characteristics, a receiver, means for coupling the output of said receiver to said first signal means to render said signal means operative in response to received energy, a second transmitter, an omnidirectional radiator coupled to said second transmitter; third, fourth and fifth signal means coupled to said second transmitter selectively to modulate the energy thereof with signals of third, fourth and fifth identifying characteristics, a cycle control circuit and means for rotating said directive antenna at a predetermined rate and for simultaneously controlling said cycle control circuit to energize said second signal means, alternately to energize said third and fifth signal means, and simultaneously to operate said means coupled between said first transmitter and said radiators to couple said first transmitter successively to its associated omnidirectional and directional radiators, to energize said fourth signal means at the time the directional antenna is pointed in a reference direction, to block said receiver during the period said fifth signal means is in operation, and to block said receiver for a short interval during the period signals from said third and fourth signal means are being transmitted.

15. A radio lighthouse station comprising a microwave transmitter, an omnidirectional antenna, a directional antenna, electronic switch means coupled between said transmitter and said antennas for selectively coupling said transmitter to said antennas, first and second pulse means for modulating the energy of said transmitter with pulses of first and second widths, an ultra high frequency receiver, means for coupling the output of said receiver to said first pulse means to key said first pulse means into operation in response to received energy, an ultra high frequency transmitter, an omnidirectional antenna coupled to said ultra high frequency transmitter; third, fourth and fifth pulse means coupled to said ultra high frequency transmitter selectively to modulate the energy thereof with pulses of third, fourth and fifth widths, a cycle control circuit and drive means for rotating said directive antenna at a predetermined rate and for simultaneously controlling said cycle control circuit to energize said second pulse means, alternately to energize said third and fifth pulse means, and simultaneously to operate said cycle control circuit to couple said microwave transmitter successively to its associated omnidirectional and directional antennas, to energize said fourth pulse means at the time the directional antenna is pointed in a reference direction, to block said ultra high frequency receiver during the period said fifth pulse means is in operation, and to block said receiver for a short interval during the period pulses from said third and fourth signal means are being transmitted.

16. A system according to claim 15, further comprising indicator display means, means for controlling said indicator display means in accordance with the rotary position of said directional antenna, and the transmission of pulses from said second pulse means, and means responsive to energy from said receiver for producing display indications on said display means.

17. A radio indicator for use with a rotatable transmitter unit comprising a first receiver, first and second signal selector means in the output of said receiver for selecting signals of a first and a second characteristic, a second receiver; third, fourth and fifth signal selector means in the output of said second receiver for selecting signals of said third, fourth and fifth characteristics, a circuit for combining the output signals from said receivers, indicator means, and means for applying signals from said combining means to said indicator means.

18. A radio indicator for use with a rotatable transmitter unit comprising a receiver means; first, second, third, fourth and fifth signal selector means in the output of said receiver for selecting pulses of first, second, third, fourth and fifth characteristics, sweep circuit means for said indicator, means responsive to pulses of another of said characteristics to control movement of said sweep in one parameter, means selectively responsive to signals of still others of said characteristics to control said sweep in another parameter, and means for applying signals from said receiver to said indicator for producing indications thereon.

19. A radio indicator for use with a rotatable transmitter unit comprising a first receiver, first and second signal selector means in the output of said receiver for selecting signals of a first and a second characteristic, a second receiver; third, fourth and fifth signal selector means in the output of said second receiver for selecting signals of said third, fourth and fifth characteristics, combining means for combining the output signals from said receivers, indicator means, sweep circuit means for said indicator, means responsive to signals of one of said characteristics to control movement of said sweep in one parameter, means selectively responsive to pulses of other characteristics to control movement of said sweep in another parameter, and means for applying signals from said combining circuit to produce indications.

20. A radio indicator for use with a rotatable beacon transmitter unit comprising a receiver means, signal selector means in the output of said receiver for selecting signals of a plurality of different characteristics, indicator means, means for applying received signals to said indicator means, sweep circuit means for said indicator, means responsive to signals of one of said characteristics to control movement of said sweep in one parameter, means selectively responsive to a signal of other characteristics to produce a second sweep control voltage to control said sweep in another parameter, a sweep control modifying means for controlling said second sweep control voltage to produce a sweep modifying control voltage dependent upon the distance of said receiver from the beacon, said second sweep control voltage and the direction of receipt of said signals, means for combining said second sweep control voltage and said sweep modifying control voltage, a control signal timer, means for applying signals of one of said other characteristics to said timer to cause said timer to block application of said sweep modifying control voltage to said means for combining during the intervals of reception of said signals applied to said timer, and means for applying output energy from said means-for-combining to said sweep circuit means to produce resultant sweep voltages at said indicator.

21. A radio indicator for use with a rotatable beacon unit comprising a microwave receiver; first and second pulse selector means in the output of said receiver for selecting pulses of first and second widths, an ultra high frequency receiver; third, fourth and fifth pulse selector means in the output of said ultra high frequency receiver for selecting pulses of third, fourth and fifth widths, an ultra high frequency transmitter means responsive to said pulses of said first width for operating said transmitter to transmit a repeated pulse, a combining circuit for combining the output signals from said receivers, indicator means, means for applying signals from said combining means to said indicator means, sweep circuit means for said indicator, means responsive to pulses of said fifth width to control movement of said sweep means, means selectively responsive to said pulses of said third and fourth width to produce a linear sweep voltage, a sweep curving circuit, means for operating said sweep curving circuit to produce a voltage dependent upon the distance of said receiver from the beacon, said linear sweep voltage and the direction of receipt of said pulse signals, a second combining circuit, means for applying said linear sweep voltage and said voltage from said sweep curving voltage to said second combining circuit, a control signal timer, means for applying pulses of said third width to said timer to cause said timer to block application of said sweep curving voltage to said second combining circuit during the intervals of reception of said third pulses, and means for applying output energy from said second combining circuit to said sweep means to produce sweep control at said indicator, whereby said indicator will alternately display different types of position indications.

22. A radio guiding system comprising means at a given location for transmitting energy characterized by a given signal, means at a second location for receiving and retransmitting said given signal, means for receiving said retransmitted energy at said given location, means for transmitting energy characterized by a different signal in response to said received retransmitted signal, means at said second location for receiving said different signal, and means for providing a distance indication in response to said received given signal and said received different signal.

23. A method of radio guiding comprising transmitting energy characterized by a given signal from a first location, receiving and retransmitting said given signal from a second location, receiving said retransmitted energy at the first location, transmitting energy characterized by a different signal in response to said received retransmitted signal, receiving said different signal at said second location, and providing a distance indication in response to said received given signal and said received different signal.

24. A radio guiding system comprising means at a given location for transmitting energy in a sharply directive pattern characterized by a given signal, means for rotating said pattern, means for receiving and retransmitting said given signal at a second location, means for receiving said retransmitted energy at said given location, means for omnidirectionally transmitting energy characterized by a different signal in response to said received retransmitted signal at said second location, means for receiving said different signal, and means for providing a distance indication in response to said received given signal and said received different signal.

25. A method of radio guiding comprising transmitting energy in a sharply directive pattern characterized by a given signal at a first location, rotating said pattern, receiving and retransmitting said given signal at a second location, receiving said retransmitted energy at said first location, omnidirectionally transmitting energy characterized by a different signal in response to said received retransmitted signal, receiving said different signal at said second location, and providing a distance indication in response to said received given signal and said received different signal.

26. A radio transmitting station comprising means for radiating energy in a given pattern characterized by alternately applied synchronizing signals of different characteristics, means for transmitting energy in a directive pattern characterized by a signal of a still different characteristic simultaneously with one of said synchronizing signals, means for receiving given signals during the periods defined by the other of said synchronizing signals, means for transmitting in a given pattern signals of a still different characteristic in response to said received signals, and means for rotating said directive pattern at a rate relatively slow with respect to the alternation periods of said synchronizing signals.

27. A radio transmitting station comprising means for radiating energy in an omnidirectional pattern characterized by alternately applied synchronizing signals of different characteristics, means for transmitting energy in a directive pattern characterized by a signal of a still different characteristic simultaneously with one of said synchronizing signals, means for receiving given signals during the periods defined by the other of said synchronizing signals, means for transmitting omnidirectionally signals of a still different characteristic in response to said received signals, and means for rotating said directive pattern at a rate relatively slow with respect to the alternation periods of said synchronizing signals.

28. A radio guiding system comprising means at a given location for radiating energy in an omnidirectional pattern characterized by synchronizing signals, means at said given location for transmitting energy in a directive pattern characterized by signals of a different characteristic from said synchronizing signals simultaneously with said synchronizing signals, means for rotating said directive pattern, means at another location for receiving said signals, means for transmitting given signals in response to said received directive signals, means at said given location for receiving said given signals, means for transmitting omnidirectionally signals of a still different characteristic in response to said received given signals, means at said other location for receiving said signals of said still different characteristic, means for producing a distance indication in response to said received directive signals and said signals of said still different characteristic, reradiating objects for reradiating said directive signals upon reception thereof and means for producing location indications of said reradiating objects in response to said received synchronizing signals, said distance indication, and the reradiated signals received from said reradiating objects.

29. A radio guiding system comprising means at a given location for radiating energy in an omnidirectional pattern characterized by synchronizing signals of different characteristics for alternate periods, means at said given location for transmitting energy in a directive pattern characterized by a signal of a still different characteristic simultaneously with one of said synchronizing signals, means for rotating said directive pattern at a rate relatively slow with respect to the alternation periods of said synchronizing signals, means at another location for receiving said signals, means for transmitting given signals in response to said received directive signals, means at said given location for receiving said given signals during the periods defined by the other of said synchronizing signals, means for transmitting omnidirectionally signals of a still different characteristic in response to said received given signals, means at said other location for receiving said signals of said still different characteristic, means for producing a distance indication in response to said received directive signals and said signals of said still different characteristic, reradiating objects for reradiating said directive signals upon reception thereof, and means for producing location indications of said reradiating objects in response to said received one synchronizing signal, said distance indication, and the reradiated signals received from said reradiating objects.

30. A radio guiding system comprising means at a given location for radiating energy in an omnidirectional pattern characterized by synchronizing signals of different characteristics for alternate periods, means at said given location for transmitting energy in a directive pattern characterized by a signal of a still different characteristic simultaneously with one of said synchronizing signals, means for rotating said directive pattern at a rate relatively slow with respect to the alternation periods of said synchronizing signals, means at another location for receiving said signals, means for transmitting given signals in response to said received directive signals, means at said given location for receiving said given signals during the periods defined by the other of said synchronizing signals, means for transmitting omnidirectionally signals of a still different characteristic in response to said received given signals, means at said other location for receiving said signals of said still different characteristic, means for producing a distance indication in response to said received directive signals and said signals of said still different characteristic, reradiating objects for reradiating said directive signals upon reception thereof means at said another location for producing location indications of said reradiating objects in response to said received one synchronizing signal, said distance indication, and the received reradiated signals received from said reradiating objects, means for producing other location indications in response to reradiated signals received from said reradiating objects and said received signals, and means for alternately displaying said different location indications.

31. A radio guiding system comprising a first transmitter means at a given location, an omnidirectional antenna, a directional antenna, electronic switch means coupled between said transmitter and said antennas for selectively coupling said transmitter to said antennas, first and second signal means for modulating the energy of said transmitter with pulses of first and second characteristics, a receiver at said given location, a second transmitter at said given location, an omnidirectional antenna coupled to said second transmitter; third, fourth and fifth signal means coupled to said second transmitter selectively to modulate the energy thereof with pulses of third, fourth and fifth characteristics, a cycle control circuit and drive means for rotating said directive antenna at a predetermined rate and for simultaneously controlling said cycle control circuit to energize said signal means in a predetermined sequence of operation and to block said receiver for a short interval during the period pulses from said third and fourth signal means are being transmitted, a first receiver at a second point spaced from said given location, first and second signal selector means in the output of said first receiver for selecting pulses of said first and second characteristics, a second receiver at said second point; third, fourth and fifth signal selector means in the output of said second receiver, a transmitter means at said second point responsive to said pulses of said first characteristic for operating said transmitter to transmit a repeated signal, said receiver at said given location serving to select said repeated signal, means for applying said selected and repeated signal to said first signal means to key said first signal means into operation, a combining circuit at said second point for combining the output signals from said first and second receivers, indicator means, means for applying signals from said combining means to said indicator means, sweep circuit means for said indicator, means responsive to signals of said fifth characteristic to control rotation of said sweep means in synchronism with rotation of said directive antenna, means selectively responsive to said pulses of said third and fourth characteristics to produce a linear sweep voltage, a sweep shaping circuit, means for operating said sweep shaping circuit to produce a voltage dependent upon the distance of said receiver from the beacon, said linear sweep voltage and the direction of receipt of said pulse signals, a second combining circuit, means for applying said linear sweep voltage and said voltage from said sweep shaping circuit to said second combining circuit, a control signal timer, means for applying signals of said third characteristic to said timer to cause said timer to block application of the sweep shaping voltage to said second combining circuit during the intervals of reception of said third pulses, and means for applying output energy from said second combining circuit to said sweep means to produce sweep control at said indicator, whereby said indicator will alternately display different types of position indications.

32. An indicating method for use with a radio transmission system wherein energy is transmitted at a first radio frequency in a directive pattern which is being rotated at a given speed, other energy is transmitted at a second radio frequency in an omni-directional pattern and is modulated with a characteristic signal when said last named pattern is in a given reference direction; wherein said second radio frequency is alternately modulated with different synchronizing signals, said first radio frequency energy is modulated with pulses of predetermined characteristics simultaneously with the modulation of said second radio frequency energy with one of the synchronizing signals; comprising receiving energy at said first radio frequency, receiving energy at said second radio frequency, selecting said characteristic signal, producing an indicating sweep in a given parameter synchronized with the rotation speed of said pattern in response to said selected signal, receiving said pulses of said predetermined characteristic, transmitting repeated pulses responsive to said received pulses, selecting the energy of said first radio frequency representing repeated received pulses, producing indications in said indicating sweep indicative of the time position of said selected pulses, producing a distance indication in response to the transmission of said repeated pulses and the reception of said repeated received pulses, modifying said sweep in a second parameter responsive to the synchronizing signals and said received pulses to provide distance simulation, and producing the indications in response to received signals incoming at said first radio frequency.

HENRI G. BUSIGNIES.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,252,083 | Luck | Aug. 12, 1941 |
| 2,427,220 | Luck | Sept. 9, 1947 |

FOREIGN PATENTS

| Number | Country | Date |
|---|---|---|
| 116,667 | Australia | Oct. 10, 1941 |